INVENTORS
JOHN E. GRIFFITH
JOHN L. BOTJER
PHILIP JUNG
DONALD C. MANNING
BY Frank A. Hauptman
ATTORNEY

COMPUTER MULTIPLEXING APPARATUS

Filed June 30, 1960 9 Sheets-Sheet 3

Nov. 23, 1965 J. E. GRIFFITH ETAL 3,219,980

COMPUTER MULTIPLEXING APPARATUS

Filed June 30, 1960 9 Sheets-Sheet 4

COMPUTER MULTIPLEXING APPARATUS

Filed June 30, 1960 9 Sheets-Sheet 5

EXAMPLE 1
FLOW DIAGRAMS

EXAMPLE 2
FLOW DIAGRAMS

EXAMPLE 2
FLOW DIAGRAM—COMPUTER B

EXAMPLE 2
FLOW DIAGRAM—COMPUTER A

United States Patent Office 3,219,980
Patented Nov. 23, 1965

3,219,980

COMPUTER MULTIPLEXING APPARATUS

John E. Griffith, John L. Botjer, Philip Jung, and Donald C. Manning, Poughkeepsie, N.Y., assignors to International Business Machines Corporation, New York, N.Y., a corporation of New York Filed June 30, 1960, Ser. No. 40,091
17 Claims. (Cl. 340—172.5)

This invention relates to electronic apparatus and more particularly to the multiplexing of computers.

Presently available data processing systems comprise several basic units: a central processor, a memory, an input/output control and peripheral input/output components. Many problems require faster computational speeds and larger systems than are now available with these components. In order to shorten problem-solving times it has become necessary to reorganize the units forming the present data processing systems into more powerful combinations capable of solving problems longer and more complex than those which can be solved by standard systems. One approach has been to divide the solution of a given problem among a group of computers (machines) thus forming a system comprising multiple central processors, etc., to work together on the solution of a problem.

A problem can be split into independent sections so that each computer works on each section simultaneously, telescoping total computational time. It is evident that there must be provided some means for permitting the computers forming the problem solving system to communicate with each other. One prior art system utilizes a primary and a secondary computer linked by data and control channels. The data channels serve to carry outgoing data from the primary to the secondary computer and incoming data from the secondary to the primary computer. The control channels transmit commands, having to do with different stages of problem solution, between the primary and the secondary computer. At certain points in the problem the primary computer sends a specific job request to the secondary computer which immediately initiates the requested solution while the primary computer continues its computations. When the secondary computer completes its job it notifies the primary computer via the control channels and then waits for a new job request. Judicious programming of the primary computer can save problem computation time by parceling portions of the problem out to the secondary computer at proper points. Yet, there is still time lost while the secondary computer waits in between assignments. This is due to the lack of synchronism between the two computers and to the fact that there are only two possibilities: "Go" or "Wait." Further, a master and slave system cannot achieve optimum scheduling of a problem since only the master computer can transfer portions of a problem for solution.

An object of this invention is to permit data processing systems to solve large and complex problems more rapidly than is now possible.

Another object of this invention is to provide apparatus which permits two or more computers to optimumly work together on the solution of one or more problems.

A further object is to provide apparatus which permits a group of computers to simultaneously solve different sections of the same problems.

Still another object of this invention is to permit each of a group of computers simultaneously solving a problem to be controllable by the other computers.

A still further object is to provide apparatus which permits each of a group of computers involved in the solution of a problem to sense the degree of progress of the other computers.

Another object of this invention is to provide apparatus for multiplexing two computers to permit both to control and process data transferred between input and output devices.

A further object of this invention is to provide apparatus for multiplexing two computers to permit either computer to transfer to the other, parts of a problem for solution simultaneously with the untransferred parts of the problem.

The foregoing and other objects, features and advantages of the invention will be apparent from the following more particular description of a preferred embodiment of the invention, as illustrated in the accompanying drawings:

The objects are achieved by the provision of counters which coordinate the execution of programs in a group of computers solving a problem. In the simplest case, one counter is associated with two computers. Either computer can count the counter up or down or set it to any value. When the counter reaches certain predetermined counts preset events may occur. Thus a different one of a group of sub-routines may be executed for each counter setting. Further the counter relates the actual time it takes each computer to execute portions of its program with the execution progress of the other computer. This relative time measurement permits the computers to keep within a certain time interval of each other, obviating programming and overrun difficulties. Also, neither machine is wholly dependent upon the other for control of processing, either computer being able to transfer problem portions to the other for solution. Either computer may request assistance from the other computer. The decision to render assistance is based upon the counter contents which take into consideration both the necessity of interrupting a computer's processing and the consequences of the interruption.

Any number of computers and counters may be combined into a problem solving system. Input/output components may be included within such systems to provide an external link. Thus a chain of counters alternating with computers may pass data "bucket brigade" fashion down a processing line. A loop may be formed by closing the chain through a counter. Closed repetitive program loops may be broken, after a fixed number of repetitions determined by a counter, for further processing in another loop; or multiple loops of computers may be linked by counters.

In the figures:

FIGS. 1*a* to 1*e* are block diagrams of various embodiments of the invention.

Figure 1A:

FIGS. 7*a*, 7*b*, 8*a*, 8*b*, 9*a* and 9*b* are flow diagrams illustrating operation of the invention.

GENERAL PRINCIPLES

This invention provides a means for allowing computers to cooperate on the solution of a given problem. The technique is that of using a "scratch pad," to make marks on, which marks serve to keep track of one's place during the solution of a problem. The effect of this method is to give computers a little more feeling of togetherness while they compute the answer to a given problem. The apparatus herein presented utilizes counters, which can take many values. The counter allows the measurement of relative time, as defined by two machine programs. A simple example of this will be given with reference to FIG. 1*a* and Table I:

*Table I*

| Program A | | Program B | |
|---|---|---|---|
| 1. | | 1. | CD |
| 2. | | 2. | |
| 3. | CU | 3. | |
| 4. | | 4. | |
| 5. | | 5. | CD |
| 6. | | 6. | |
| 7. | CU | 7. | |
| 8. | | 8. | |
| 9. | | 9. | |
| 10. | | 10. | CD |
| 11. | CU | 11. | |

It may be assumed that two computers (or "machines") units A and B, operate on the same data in their respective memory units, and that the program in computer A must operate on the data before the program in computer B gets to it. A counter is connected between the two machines in such a manner that it is counted up by one whenever a bit CU occurs in an instruction in Program A. The same counter is counted down by one whenever a bit CD occurs in an instruction in computer B. This counter is constructed so that it cannot count below zero; in other words, it can contain only positive numbers. The counter makes certain that computer B can never get ahead of computer A in the execution of the program in computer A. This is done by observing those places in the two programs where it is absolutely necessary to prevent computer B from running ahead of computer A. Wherever such places occur, the corresponding instructions are marked with special bits reserved for this purpose. In the example shown, Program A has instructions 3, 7 and 11 marked with a bit CU. Program B has instructions 2, 5 and 10 marked with a bit CD.

The requirements for this example are that instruction 3 in Program A must be executed before instruction 1 in Program B is executed. The same is true for instruction 7 in Program A and instruction 5 is Program B, and for instruction 11 in Program A and instruction 10 in Program B. Both programs are executed simultaneously unless a bit occurs which would step the counter above all ones or below all zeros. Thus computer A is stopped if a bit CU occurs after the counter contains all ones. Similarly, computer B is stopped if a bit CD occurs after the counter contains all zeros. Both programs are processed simultaneously whenever the counter is returned to a count between these limits.

It will be seen that in the execution of Program A the counter will be counted up by one whenever a marked instruction is encountered and the counter will be counted down by one whenever a marked instruction is encountered in Program B. If the two computers are started simultaneously with the two given programs in their respective memories, the value in the counter is zero. At this point, computer B would do nothing because the counter cannot be counted below zero, but there is nothing that would prevent computer A from proceeding normally. As soon as computer A has executed instruction 3, the counter would be counted up by one, thereby allowing computer B to start and count it down to zero. This act will allow computer B to proceed until it encounters instruction 5. If, at this time, computer A has executed instruction 7, the counter will register a count greater than zero and computer B will count it down as it proceeds. If, when computer B arrives at instruction 5, the counter is still at zero, computer B will stop and wait for the counter to be counted up by one.

If computer A proceeds much faster than computer B, the counter will contain a value higher than one. This value is somewhat of a measure of how far computer B lags behind computer A. This is what was meant in the previous reference to the ability of a counter to measure the relative time of execution of two computer programs. Notice that in the example given, computer A is a free running computer and computer B is free running until it threatens to pass computer A. The coupling between the two machines in completely specified by the bits (CD or CU) on the appropriate instructions, and these bits allow any degree of coupling desired.

Figure 1B:
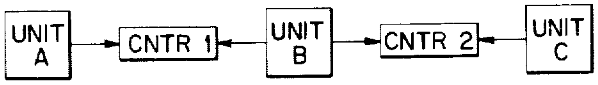

Referring now to FIG. 1*b* and to Table II a variation of the previous example, concerned with three machines working on the same problem, will be discussed.

*Table II*

| Program A | Program B | Program C |
|---|---|---|
| 1. | 1. | 1. |
| 2. | 2. CD(1) CU(2) | 2. CD(2) |
| 3. | 3. | 3. |
| 4. CU(1) | 4. | 4. |
| 5. | 5. | 5. |
| 6. | 6. CD(1) CU(2) | 6. |
| 7. CU(1) | 7. | 7. |
| 8. | 8. | 8. CD(2) |
| 9. CU(1) | 9. | 9. |
| 10. | 10. | 10. |
| 11. | 11. CD(1) CU(2) | 11. CD(2) |

This time there are three computers working in sequence on the same data. Computers A and B operate as before, the addition of Counter 2 allowing Computer C to work on the data after Computer B is finished with it. Counter 2 is counted up (CU(2)) by marked instructions in Computer B and is counted down (CD(2)) by marked instructions in Computer C. Thus, Counter 2 prevents Computer C from preceding Computer B in exactly the same manner as the Counter prevents Computer B from preceding Computer A in the previous example. It may be seen that a marked instruction in Computer B affects two counters; such an instruction causing Counter 1 to be counted down at the same time it causes Counter 2 to be counted up. It may be seen that this idea may be extended to any number of computers working on the same problem if the conditions of the problem are as described in the previous example.

The next example concerns the recursive nature of programs, FIG. 1*a* and Table III illustrating the situation, "TIX" means "conditional transfer to step 1."

*Table III*

| Program A | Program B |
|---|---|
| 1. CU | 1. CD-"Go on Two" |
| 2. | 2. |
| 3. | 3. |
| 4. | 4. |
| 5. | 5. |
| 6. | 6. |
| 7. TIX | 7. TIX |

The complications included here are that the two programs are formed as loops, it being desired to control the two machines so that Computer B follows Computer A by one execution of the loop in Computer A. In other words, it is desired that Computer B work on the data used by Computer A only after Computer A is through with it. There is nothing new about this requirement, but the fact that the programs are in the form of loops and not open-ended sets of instructions puts an additional requirement on the counter system in the starting procedure.

In order to get the situation displayed in Table III started, it is necessary to introduce a special command indicated at the beginning of Program B: "Go on Two." This command may obviously be a variation of count indicator bits which occur in instructions, except that this command affects the time at which the succeeding program steps will be allowed to proceed. In this case, the "Go on Two" command will not allow Computer B to proceed until the count of two (or other specified value) appears in the Counter. Program B does not count the Counter Down until the condition specified by the instruction is satisfied. When the specified count is reached, the Counter is immediately counted down by the amount (two) of the count, and by this means the lag between Computers A and B is maintained at one loop execution. If the value specified by the instruction in Computer B were six, the relative lag between the two machines would be five loop executions. Another way of stating this is that the Counter maintains a constant loop execution ratio between Computers A and B. The "Go" command is a bias mechanism which introduces a measure of control on the contents of the counter. In the last case, where the "Go" instruction specified a value of six, Computer A would be working on the sixth execution of its loop while Computer B would be working on the first execution of its loop; thus making the lag five (the difference between the cycles of execution of the two computers). It is also clear that the lag between the two computers can never be less than five, although it may be as much more as necessary, and would be limited, in this example, only by the size of the counter.

Another way of accomplishing the same thing would be to have the value specified by the "Go" command retained by the Counter in such a manner that the lowest possible value which would be allowed would be the value specified (in the last case, six), until another instruction is encountered which changes the value up or down. This method of introducing bias level on the counter allows one to manipulate the counter contents in a more general fashion by allowing the reference to be set at any real value of the counter.

Referring to FIG. 1*b* and Table IV an extension of the last example to the case of three or more computers will be discussed. The conditions of the problem are the same as before, and nothing more than an illustration of the starting procedure for this case will be given.

When Computer A starts, it will cause Counter 1 to be counted up by one. The "Go" instruction at the start of the routine in Computer B will prevent Computer B from starting until the count in Counter 1 is two. When Computer A begins the second pass of its loop, the contents of Counter A will be counted up by one, making the total two. The "Go on Two" command in Computer B will then subtract two from the contents of Counter 1 and allow the execution of the program in Computer B to proceed. At the same time this action occurs, Computer B will cause Counter 2 to be counted up by one. When Computer B starts its second pass, the contents of Counter 2 will be counted up by one, making the total two. Computer C will therefore start up and, at the same time, two will be subtracted from the contents of Counter 2. The net result will be that the three computers will be executing their respective programs (loops) with a lag of at least one between each computer's execution cycle. Note, also, that it is impossible for the computers to overrun each other, for a zero count in either counter will hold up the rest of the chain until it is safe to proceed. For the example shown, it is also clear that as many computers may work on the data as is needed if a counter is inserted between each pair in the chain. It should also be noted that the lag between any two computers may be set at any value, or number of loop executions, that is desired. The bias mentioned above will remain at the lowest value set, and this will effectively prevent the various loops being executed in the various computers from getting too close to each other. A practical example of the case chosen here is the usual input-output operation where one wishes to read from a tape, operate on the data, and write the updated data back out on a new tape without worrying about synchronizing the program loops.

*Table IV*

| Program A | Program B | Program C |
|---|---|---|
| 1. CU(1) | 1. CD(1)-"Go on Two"-CU(2) | 1. CD(2)-"Go on Two" |
| 2. | 2. | 2. |
| 3. | 3. | 3. |
| 4. | 4. | 4. |
| 5. | 5. | 5. |
| 6. | 6. | 6. |
| 7. | 7. | 7. |
| 8. TIX | 8. TIX | 8. TIX |

Still referring to FIG. 1*b*, a similar system may be implemented as shown in Table V.

*Table V*

| Program A | Program B | Program C |
|---|---|---|
| 1. CU(1) | 1. CD(1)-"Go on Two"-CU(2) | 1. CD(2)-"Go on Three" |
| 2. | 2. | 2. |
| 3. | 3. | 3. |
| 4. | 4. | 4. |
| 5. | 5. | 5. |
| 6. | 6. | 6. |
| 7. | 7. | 7. |
| 8. TIX | 8. TIX | 8. TIX |

It will be noticed that the "Go on Two" in Program C has been changed to "Go on Three." The counters in this example only are of a type which indicate the number of count-up signals and the number of count-down signals as well as the total count. At the beginning, when Computer A starts, Counter 1 is counted up by one. Computer B counts Counter 1 down by one and Counter 2 up by one. When Computer A begins its second pass, Counter 1 is counted up by one. Computer B, which is still waiting, immediately counts Counter 1 down by one and Counter 2 up by one. At this time, since Counter 1 has been counted up a total of two, Computer B proceeds. When Computer A has begun its third pass, it will count Counter 1 up by one, and when Computer B begins its second pass, it will count Counter 1 down by one and Counter 2 up by one. At this time, a total of three will have been counted up in Counter 2, and Computer C will proceed. If the computers are to maintain the given relationship, Counter 1 must not be counted below one, and Counter 2 must not be counted below two.

A difference exists between the operation of the two alternatives illustrated in Tables IV and V. In the case of Table IV each machine must wait until its precedent starts before it can start. In Table V, each time a computer starts up, there is an immediate rippling of the count across all the counters in the system. This implies that any computer in the chain may start up on any cycle after the initial computer has begun its cycling; however, it is still necessary that the computers execute their cycles after the preceding computer. Therefore, the effect is still the same as if the values used were relative to the precedent computer instead of the starting computer.

To summarize briefly, Tables IV and V illustrate the logic of starting and maintaining a minimum lag between computer execution cycles for the case of simple recursive programs in each machine and for the case of more than two computers in the chain.

Figure 1C:
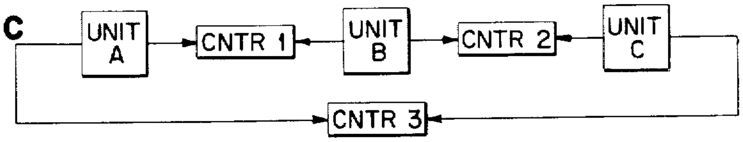

The line of thought indicated by these two examples will now be extended to a more complicated case. This case has as its salient feature a higher level of recursiveness than either of the two preceding examples. The previous case (FIG. 1*b* and Table V) with the additional requirement that the programs in each of the computers have both inner and outer loops is shown in FIG. 1*c*. In particular, the loops pass over the data used by the precedent computer. The important change in this example is that the chain of computers is a closed loop, not an open loop, as in all of the previous examples. In other words, Computer A will have Computer C as its precedent, once started, the effect being that of a closed loop of computers operating in order on a closed loop of data. In the previous examples, the chain of computers was an open loop of computers operating on an open loop of data. In this example, there is the additional condition that Computer A, when it arrives at the end of the data, will then start over on the same data. But means must be provided for preventing Computer A from operating on the data before Computer C is through with it. This example is somewhat more difficult than some of the past examples, for when Computer A starts the second pass on the data, the data may have been replaced, with new data, and it is still necessary to make sure that Computer A does not overtake Computer C.

If Table VI is referred to in conjunction with FIG. 1*c*, an example of a closed loop system will be understood.

*Table VI*

| Program A | Program B | Program C |
|---|---|---|
| 1. CD(3)-"Go on Zero"-CU(1) | 1. CD(1)-"Go on Two"-CU(2) | 1. CD(2)-"Go on Three"-CU(3) |
| 2. | 2. | 2. |
| 3. | 3. | 3. |
| 4. | 4. | 4. |
| 5. | 5. | 5. |
| 6. | 6. | 6. |
| 7. | 7. | 7. |
| 8. | 8. | 8. |
| 9. | 9. | 9. |
| 10. | 10. | 10. |
| 11. TIX | 11. TIX | 11 TIX |

This example assumes the same conditions as before. It should be noticed that Computer A now counts Counter 3 down as it counts Counter 1 up. This feature closes the loop of computers, and allows the whole chain to operate on data in a recursive fashion. The starting commands operate as usual, except that "Go on Zero" in Computer A refers to the contents of Counter 3. In this Example, the contents of the counters are held as bias levels or lags between respective machine cycles. Thus, when Computer A starts its second pass, Computer B will start its first pass. When Computer A starts its third pass, Computer B will start its second pass, and Computer C will start its first pass. This will get the chain started, and as Computer C makes its passes over the data Counter 3 will be counted up. When Computer A gets ready to operate on the data finished by Computer C, Computer A will count down Counter 3 as it does so. Note that Computer A may not start its fourth pass until Computer C has finished its first pass. This is an interpretation of the present example, for it is assumed for simplicity that there are only three batches of data to be worked on, and that the order for each machine will be batches 1, 2, 3, 1, 2, 3 . . . etc. Thus, Counter C interlocks the chain such that Computer A cannot start its second pass over data batch 1 until Computer C has finished its first pass over the same batch. If there are more than three batches of data, ten batches for instance, the lag between Computer C and Computer A will be large, but in any case, Computer A will never be able to overrun Computer C. When all passes have been made through all the data, the exit from each of the loops must provide for one last count which will allow the following machines to pass over the same data.

The basic method by which a complex of computers may be brought to bear on a given problem, if the problem satisfies certain conditions, has been introduced. The principal condition that such a problem must satisfy is tha it must be capable of solution by division of the work of the solution such that the various parts follow each other in a fixed sequence. If this is possible, then a computer may be assigned to compute each part of the work, and the sequence of the computers will be the same as that of the various parts of the work. Therefore, in order to guarantee a correct solution, it is only necessary to make certain that succeeding computers do not overrun each other. It is not necessary to keep the lag between computers to a minimum, but it is desirable to do so.

Figure 1D:
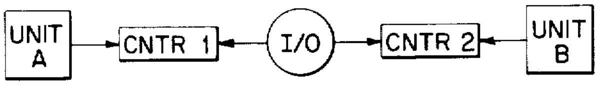

Referring now to FIG. 1*d*, there are shown two computers which process information from an external input-output unit. This is practical in those cases where the unit may contain both seldom used (low activity) and often used (high activity) file parts. While the low activity part of the file is being passed, Computer A can easily handle the work. When a high activity part of the file presents itself, Computer A cannot handle the load. In this situation, the unit connection is made to Computer B causing that system to start up if Counter 2 is counted down to zero, and process the records that are coming at the time. In this example, interrupt conditions are brought on by reading zero counts in the Counters, allowing Computer B to be interrupted at any marked point in its program, ameliorating the problems of memory assignment. It will be noted that many other operations may also be made dependent on the contents of the counters, and that many variations of these features may be proposed.

Figure 1E:
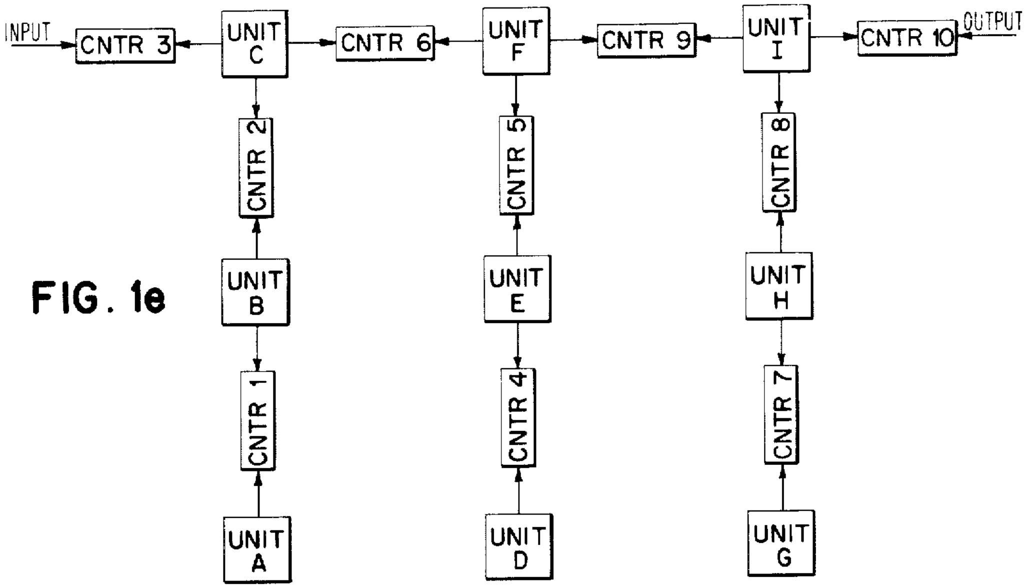

FIG. 1*e* illustrates an example of the formation of nets, or arrays, of computers. These nets, using the techniques described previously, allow counters to control multiple computer installations. The formation of a net of machines that will collectively solve a problem which can be split up into a sequence of parts, each of which can be solved separately, is shown. Each computer is equipped with its own Memory, I/O instruction set, etc., whereever any of these features is necessary.

First considering the first vertical column of machines, composed of Computers A, B and C, a Counter 1 counted up by Computer A and down by Computer B, is situated between Computers A and B. Computer A has as its function the generation of certain data that is to be processed by the system. Thus, when Computer A has generated a record of data it is passed via a bus to Computer B. At the same time, Counter 1 is stepped up by one. The function of Computer B is to further process the record from Computer A, but in a special manner, for whenever Computer B starts processing a record from Computer A, Counter 1 is counted down. When computer B is finished with the processing of the record, it then causes Counter 2 to be counted up, which signifies that a record of data is ready for Computer C. When Computer C starts processing the record from Computer B, Counter 2 is counted down. Computer C has an input other than that from Computer B which will be taken to be magnetic tape, although it could be anything that is suitable for the problem. While the operations in Computers A and B were going on, the Input tape has been caused to read a record into the Memory of Computer C. This action has caused Counter 3 to be counted up by one. When Computer C senses that Counter 2 contains a count greater than zero and that Counter 3 contains a count greater than zero, it senses that the next record from each of the two inputs is ready for processing. The function of Computer C is to process the data from the tape with an equivalent and matching record from Computer B. The output of this operation is then placed on a bus to serve as input to Computer F. Note that when Computer C begins to process the two records, it causes Counters 2 and 3 to be counted down by one. When the output from Computer C is ready for Computer F, Counter 6 is counted up by one. It will now be seen that the two chains made up of Computers D, E and F and Computers G, H and I will operate in the same manner, each chain feeding data to the top row of computers. The data from the tape thus is operated upon by data from each of three chains and eventually is written out on another tape. Counters 1, 4 and 7 are limited in value in order to keep Computers A, D and G from overrunning their neighbors. For instance, the Counters 1, 4 and 7 may have a maximum value of four. This means that when any of the Computers has computed four records ahead of its neighbor, it will stop until the neighbor has counted the Counter down by at least one.

It has been shown that a net of nine computers and ten interleaved counters can compute the answer to a problem, the solution of which can be broken up into a sequence of parts. It will be noticed that there are no closed loops of computers in this example. That situation can be treated as explained previously. A feature emphasized here is the action based on a coincidence of counters. This is illustrated in the cases of Computers C, F and I. Computer C proceeds only on a coincidence of Counters 2 and 3; Computer F proceeds only on a coincidence of Counters 5 and 6; Computer I proceeds only on a coincidence of Counters 8 and 9. The coincidence in this case is the simplest possible type; that of both counters containing counts greater than zero. Another remark concerns the number of computers that occur in this net. Since the net is open-ended, there is nothing preventing the replacement of any two adjacent computers with one new machine that does the work of the two replaced. There is also nothing that prevents any one machine from being replaced with two machines connected in serial with a counter between them. By this means, one may expand or contact the net of machines to any degree.

STRUCTURE OF PREFERRED EMBODIMENT

Figure 2:
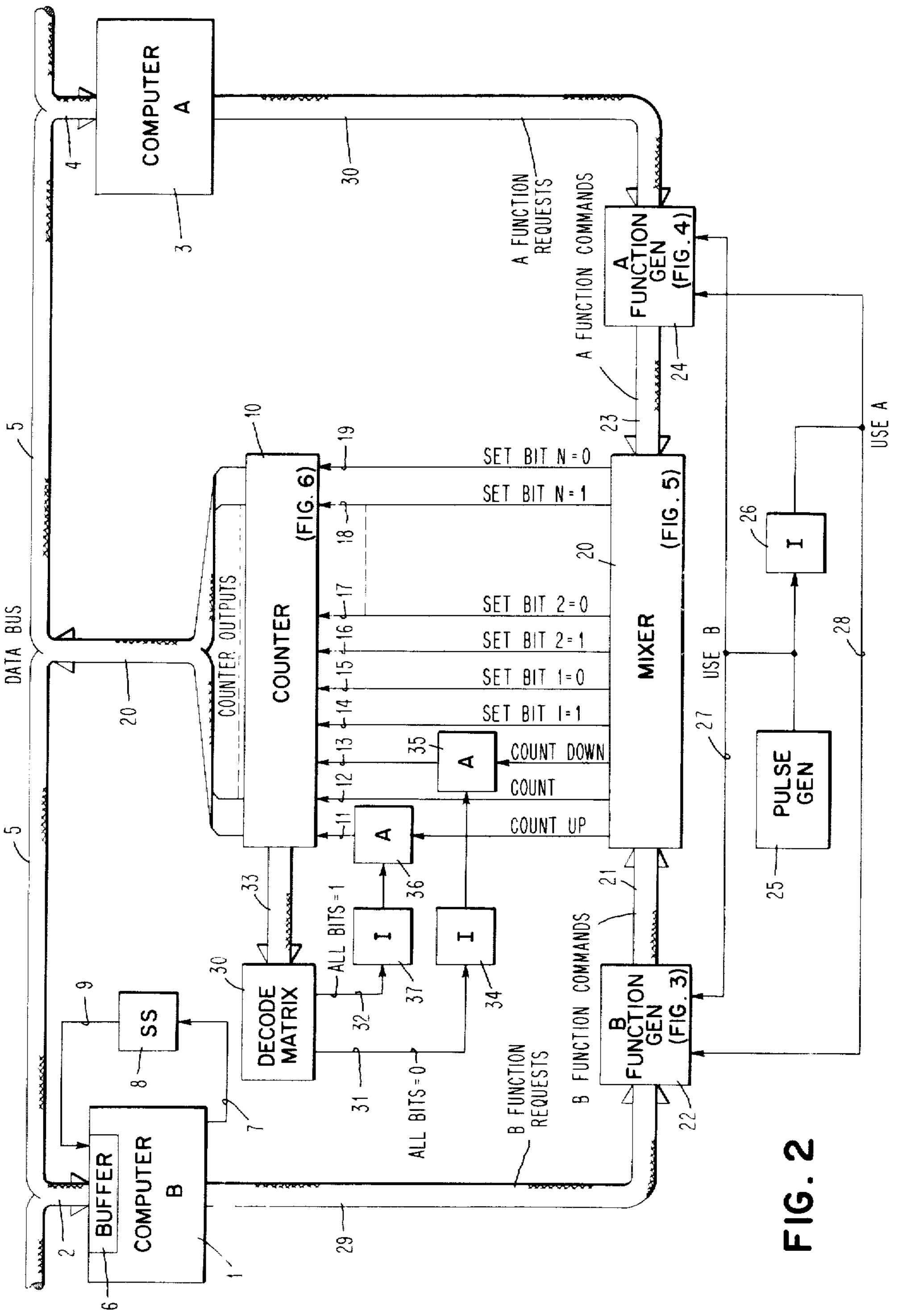
FIG. 2 is a block diagram showing controls associated with the embodiment of FIG. 1*a*.

Referring to FIGURE 2 there is shown apparatus for implementing the embodiment illustrated in FIG. 1*a*. The B computer 1 includes a buffer 6, and input/output bus 2, an output bus 29, a line 7 connected to a single-shot multivibrator 8 and a line 9 connecting the single-shot multivibrator 8 to the buffer 6. Computer B may be any type of data processing system: parallel, serial, binary, decimal, etc. The A computer 3 includes an input/output bus 4 and an output bus 30. Computer A may also be any type of data processing system that it is convenient to use. Data bus 5 is provided to transfer data between computer A and computer B and to other computers or input/output equipment. For the purpose of illustration computer A is assumed to have associated with it internally a sophisticated input/output data transfer unit which is capable of receiving or transmitting data at various rates of transmission and various forms (serial or parallel, etc.). For the purpose of a broad illustration, computer B is assumed to be a less sophisticated unit not having such an input/output transfer apparatus associated with it. Thus computer A is capable of receiving data from data bus 5 serially and assembling it internally for future use. On the other hand, computer B requires a buffer storage 6 wherein serial data from data bus 5 is assembled. In order to move data assembled in buffer 6 to the memory of computer B it is necessary to activate line 7 which sets single-shot multivibrator 8 ON, bringing line 9 UP for a period determined by the duration of the ON state of a single-shot multivibrator 8. For this period the contents of the buffer 6 will remain unchanged to permit computer B to remove the contents for internal processing. When line 9 falls, buffer 6 may receive further information from data bus 5.

Bus 29 of computer B carries function requests directed to a counter 10. Similarly bus 30 from computer A carries function requests directed to the same counter 10. These function requests may include requests that the counter 10 count up or count down or that some particular position of the counter, or all of the positions, be set to either a "1" or a "0" state.

The N-position counter 10 is of no particular type. It may be binary or decimal or it may count in such a manner that only one output line at a time is UP. It is only specified that counter 10 be capable of counting up or counting down, and that it be possible to set any one or all of its bit positions to a desired state. For convenience it will be assumed that counter 10 is binary, having N bit positions, the inputs to three (14 through 19) being shown in FIG. 2. Overflow or underflow of the counter 10 is prevented by the decode matrix 30 which brings UP line 31 whenever all counter positions are "0," and brings UP line 32 whenever the counter positions are all "1." Decode matrix 30 is connected to the outputs of counter 10 by means of bus 33. If the counter bit positions are all "0," it is undesirable to permit a further count-down of counter 10. This condition brings line 31 to inverter 34 UP causing AND gate 35 to be blocked, which prevents any further count-down requests from reaching the counter 10 on Count-Down line 13. Similarly, if all bits of the counter 10 are "1," line 32 will be UP, blocking AND gate 36 due to inverter 37, which will prevent Count-Up line 11 from stepping the counter 10 up. Outputs from counter 10, provided for the one state of each bit position of the counter outputs, are connected to the data bus 5 by means of bus 20.

The computers A and B may request certain counter changes indicated by lines 11 through 19 in FIG. 2. These requests for functions are processed by apparatus now to be described generally. Function requests from either computer B or computer A are translated into function commands by respective ones of the B Function Generator 22 and the A Function Generator 24. If B Function Generator 22 receives a Count-Up request from computer B on bus 29 at the same time that A Function Generator 24 receives a Count-Up request from computer A on bus 30, the requests obviously cannot be processed simultaneously. The requests in order to both be effective must be processed in some sequence, though the order of processing itself is not important. The Function Generators 22 and 24 mainly serve to store function requests as they occur and then release them as function commands on buses 21 and 23 in some ordered sequence so as to give simultaneously occurring requests effect as nonsimultaneous commands. The necessary timing is achieved by means of pulse generator 25 and inverter 26, connected to Use B line 27 and Use A line 28 respectively. Mixer 28 serves to transmit the two sets of nonsimultaneous inputs from the Function Generators 22 and 24 on one set of function lines to the counter 10. A subsidiary duty of the Function Generators 22 and 24 is to generate a Count pulse whenever a Count-up or Count-Down function command is transmitted. This is done to simplify the counter 10 circuitry and is not an absolute requirement.

The mixer 20 is provided to transmit commands from Function Generators 22 and 24 to the counter 10. The commands appearing on buses 21 and 23 never occur simultaneously and thus need only be mixed to present the proper outputs on lines 11 through 19 connecting mixer 20 with counter 10. For instance, a Count-Up request to B Function Generator 22 may occur simultaneously with a Count-Up request to A Function Generator 24. This will eventually appear as a command on bus 21 which causes Count-Up line 11 and Count line 12 to be brought UP. At some other time, either earlier or later, the Count-Up request to A Function Generator 24 will cause commands to appear on bus 23 bringing Count-Up line 11 and Count line 12 UP. Thus Count-Up line 11 and Count line 12 are brought UP twice despite the fact that the Count-Up requests occurred simultaneously. The mixer 20 receives some commands from the Function Generators 22 and 24 which do not appear on any of the output lines 11 through 19. These commands are to set all bits of the counter 10 to either "1" or to "0." It is not necessary to provide separate lines for this purpose to the counter 10 because the mixer 20 contains circuitry for bringing up all the set bit lines simultaneously.

Figure 3:
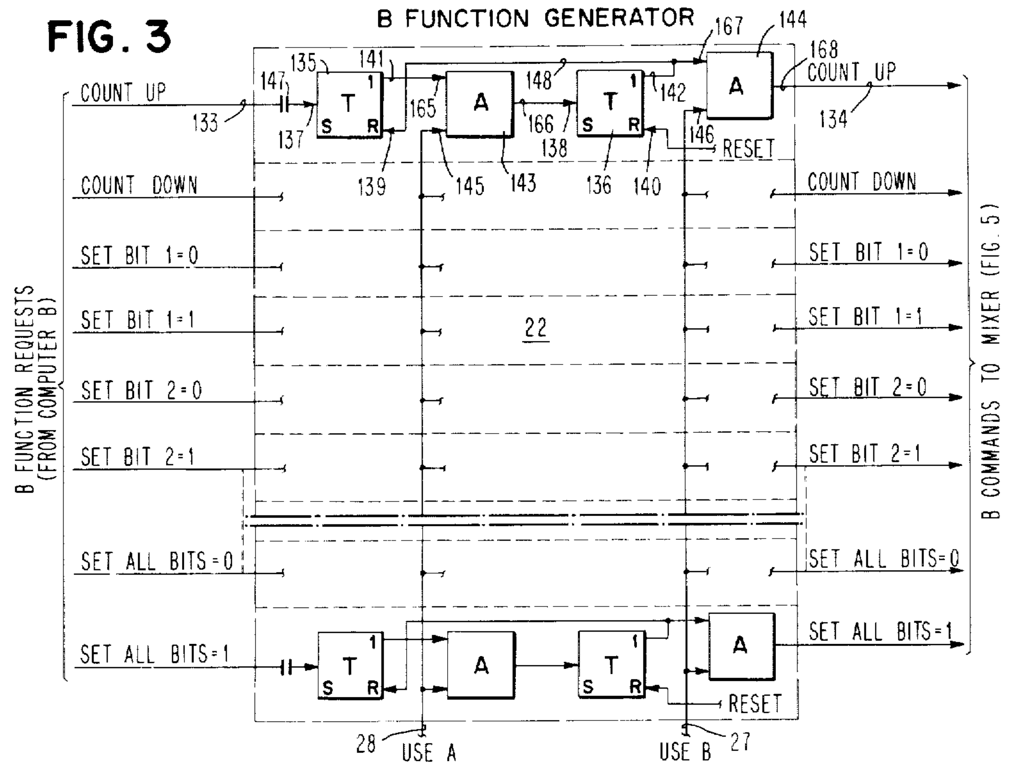
FIGS. 3 and 4 are schematics of devices usable as the Function Generators shown in FIG. 2.

Referring to FIG. 3, there is shown the B Function Generator 22. The generator 22 comprises one channel for each of the function requests from computer B. All these channels are identical, therefore no purpose would be served in repeating a description of each one. The only channel described will be the one having Count-Up request input line 133 and Count-Up output command line 134.

For every channel of the B Function Generator 22, there are provided two bistable triggers 135 and 136, each having a set input 137 and 138, respectively, a reset input 139 and 140, respectively, and a "1" output 141 and 142, respectively. An UP level on the set line 137 or 138 will bring UP the "1" output line 141 or 142. An UP level on the reset line 139 or 140 will bring DOWN the corresponding one of lines 141 or 142. There are also provided two AND circuits, 142 and 144. Each AND circuit is provided with two inputs and an output line which is UP only if both input lines are UP. If only one or none of the inputs to an AND circuit is UP, the output will be down. AND circuit 143 is provided with input lines 145 and 165 and an output line 166. Input line 165 of AND circuit 143 is connected to the "1" output 141 of trigger 135. Input line 145 of AND circuit 143 is connected to Use A line 28. AND circuit 144 is provided with input lines 146 and 167 and an output line 168. Input line 167 of AND circuit 144 is connected to the "1" output 142 of trigger 136. Input line 146 of AND circuit 144 is connected to Use B line 27. The Count-Up request line 133 is connected to the set input 137 of trigger 135 by means of capacitor 147. This capacitor serves to isolate the trigger 135 from steady state voltages on the Count-Up request line 133. The trigger 135 reset input 139 is connected to the "1" output 142 of trigger 136 by means of line 148. The Use B line 27 is connected to the pulse generator 25 and Use A line 28 is connected to the inverter 26, both shown in FIG. 2. Use A line 27 and Use B line 28 are alternately UP, never being UP simultaneously. Referring to FIG. 2, this is achieved by means of the pulse generator 25 and the inverter 26 which transmit oppositely phased signals on Use B line 27 and Use A line 28, respectively.

Referring again to FIG. 3, assuming that computer B requests a Count-Up function, Count-Up line 133 will be brought UP sending a pulse to the set input 137 of the trigger 135. The "1" line 141 of trigger 135 is brought UP by the set pulse on line 137. When Use A line 28 comes UP, both inputs to AND circuit 143 will be UP bringing UP output line 166 to set trigger 136 so as to bring UP its "1" output line 142. When line 142 is brought UP trigger 135 reset line 139 is brought UP by means of line 148 causing "1" output line 141 to fall. This permits subsequent computer B Count-Up requests to enter on line 133, even though no Count-Up command has at this time been transmitted on Count-Up line 134. When Use B line 27 comes UP, then both inputs to AND circuit 144 will be UP bringing Count-Up line 134 UP to transmit the desired command. Trigger 136 reset input 140 must be brought UP to reset the trigger.

The Count-Down channel of the B Function Generator 22 is identical to the Count-Up channel just described. The same is true of the Set Bit 1=0, Set Bit 1=1, Set Bit 2=0, Set Bit 2=1, etc., Set All Bits=0, and Set All Bits=1 channels. There are channels provided for each position of the counter 10 shown in FIG. 2. All of the aforementioned channels have an input function request line and an output command line. As previously explained, the input request line may be brought UP at any time but the corresponding output command line will be brought UP only at the time when the Use B line 146 comes UP.

Figure 4:
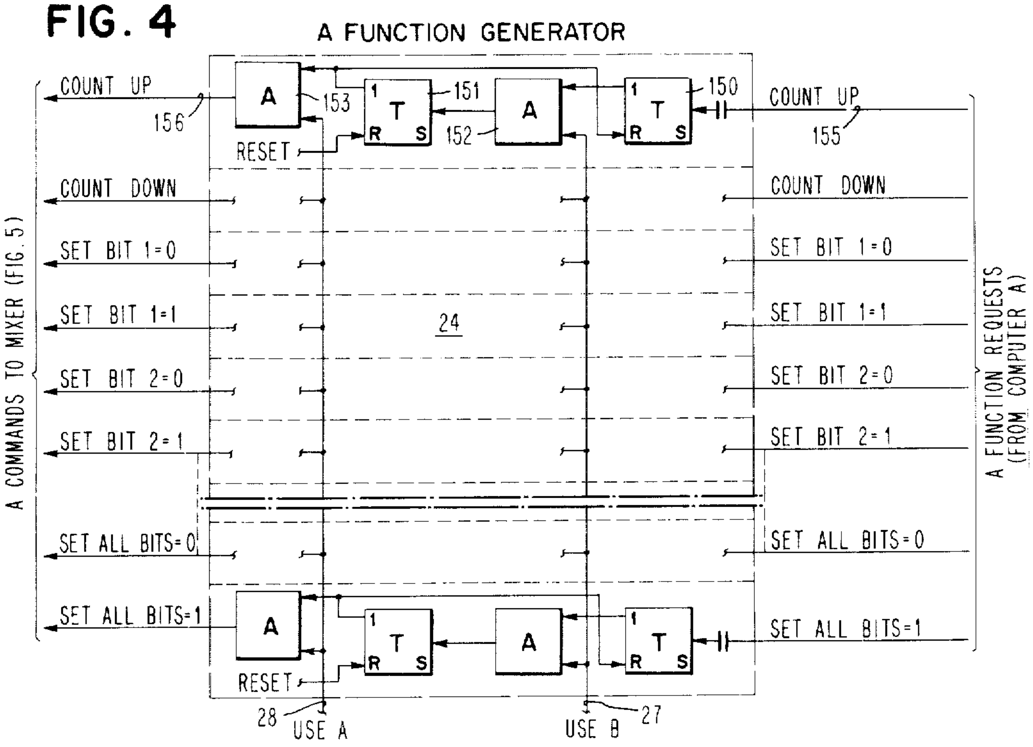

Referring now to FIG. 4, the A Function Generator 24 is shown. No purpose would be served by a detailed explanation of this generator since it is a mirror image of the B Function Generator 22 shown in FIG. 3. The triggers 150 and 151 are identical to the triggers 135 and 136 shown in FIG. 3. Further, the AND circuits 152 and 153 are identical to the AND circuits 143 and 144 shown in FIG. 3. The cooperation of trigger 150, AND circuit 152, trigger 151 and AND circuit 153 is identical to the cooperation of the corresponding circuits shown in FIG. 3.

The operation of the A Function Generator 24 is such that an output command cannot occur simultaneously with an output command from the B Function Generator 22. This is made possible by means of Use A line 24 and Use B line 27 which connect to the inverter 26 and pulse generator 25 in FIG. 2. As explained with reference to FIG. 3, Use A line 28 and Use B line 27 are never UP simultaneously but rather alternate in being UP. Thus, if a Count-Up request appears on Count-Up line 155, trigger 150 is set to "1." At the time that the B Function Generator 22 would normally transmit output commands (Use B line 27 being UP), the A Function Generator 24 AND circuit 152 is activated by means of Use B line 27 thus setting trigger 151 to the "1" state. Use A line 28 comes UP at a time that it is impossible for B Function Generator 22 to transmit any output commands. However in A Function Generator 24, the AND circuit 153 is activated at this time by an UP level on Use A line 28 resulting in a Count-Up command on line 156. All other channels of the A Function Generator 24 have identical structure.

In summary, inspection of FIGS. 3 and 4 together indicates the manner in which simultaneous input requests are separated to result in sequential output commands by means of the Use A line 28 and the Use B line 27 which are never UP simultaneously. The function generators permit the computer commands to occur asynchronously. Sequential commands are transferred from the Function Generators 22 and 24 to the mixer 20, which will now be described.

Figure 5:
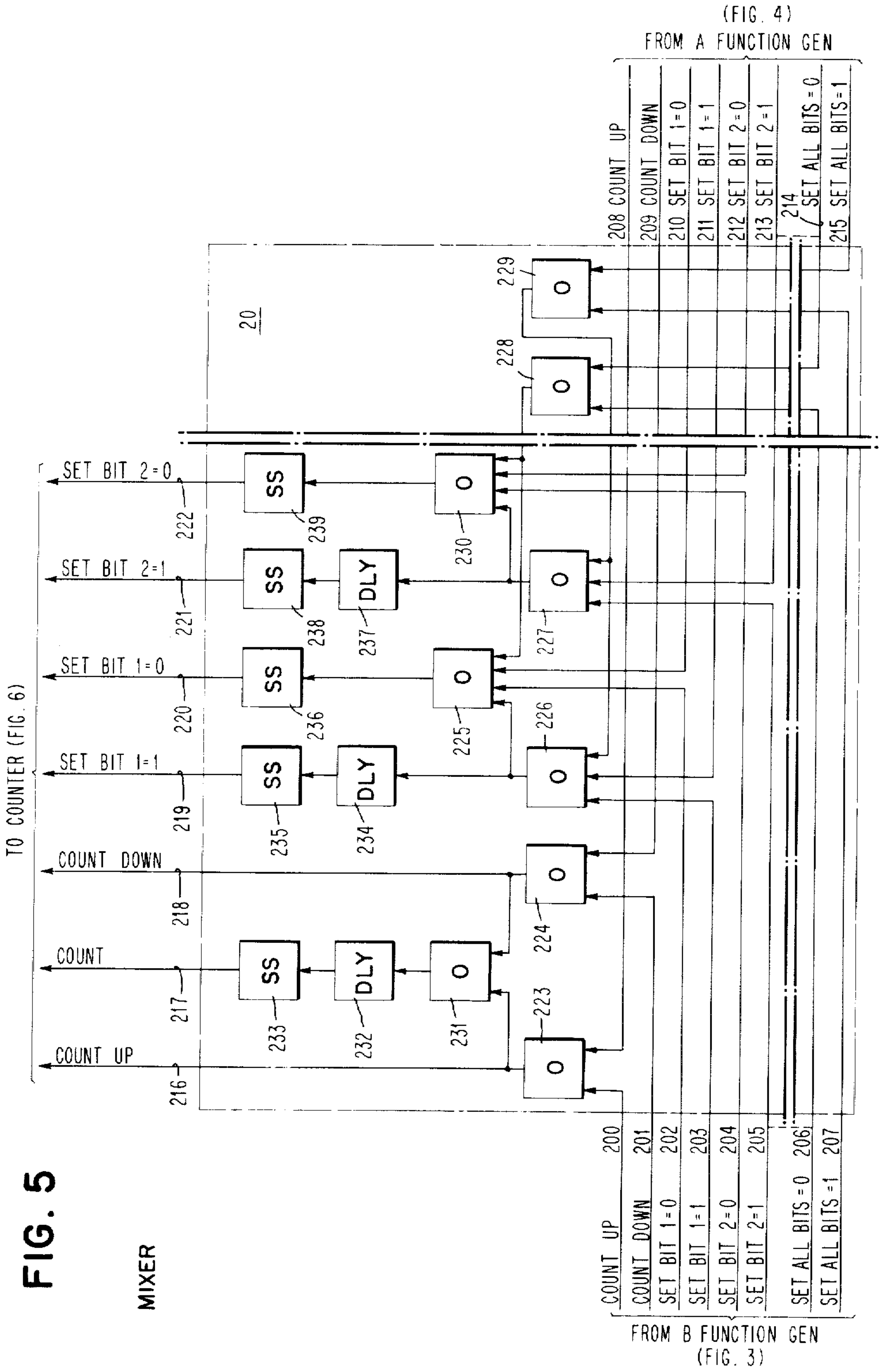
FIG. 5 is a schematic of one device usable as the Mixer shown in FIG. 2.

Referring to FIG. 5, the mixer 20 serves to combine the commands on two sets of lines from the B Function Generator 22 and the A Function Generator 24 transmitting these commands to the counter 10 on one set of lines. The commands from the B Function Generator 22 enter the mixer 20 on the following lines: Count-Up line 200, Count-Down line 201, Set Bit 1=0 line 202, Set Bit 1=1 line 203, Set Bit 2=0 line 204, Set Bit 2=1 line 205, Set All Bits=0 line 206 and Set All Bits=1 line 207. Duplicates of these lines enter from the A Function Generator 24 as lines 208 through 215. It is to be noted that sufficient commands are provided to permit setting of every bit position of the counter 10 to either "0" or "1." For brevity only the first two bit positions are shown, however, any number may be provided. The outputs of mixer 20 are as follows: Count-Up line 216, Count line 217, Count-Down line 218, Set Bit 1=1 line 219, Set Bit 1=0 line 220, Set Bit 2=1 line 221 and Set Bit 2=0 line 222. Again it is to be noted that a pair of Set Bit lines should be provided for each bit position of the counter 10, though only two such pairs are shown in FIG. 5.

The Count-Up line 200 and Count-Up line 208 form the inputs of OR circuit 223. Count-Down line 201 and Count-Down line 209 form the inputs to OR circuit 224. Set Bit 1=0 line 202 and Set Bit 1=0 line 210 form two inputs of OR circuit 225. Set Bit 1=1 line 203 and Set Bit 1=1 line 211 form two inputs of the OR circuit 226. Set Bit 2=1 line 205 and Set Bit 2=1 line 213 form two inputs of the OR circuit 227. Set All Bits=0 line 206 and Set All Bits=0 line 214 form the inputs of OR circuit 228. Set All Bits=1 line 207 and Set All Bits=1 line 215 form the inputs to OR circuit 229. Set Bit 2=0 line 204 and Set Bit 2=0 line 212 form two of the inputs to OR circuit 230. The output of any one of the OR circuits 223 through 230 is brought UP whenever any one of the inputs to the particular OR circuit is UP. The only time that an output of any one of the OR circuits 223 through 230 is not UP is when all of the inputs to that OR circuit are down. Thus, for example, when either Count-Up line 200 or Count-Up line 208 is UP, Count-Up line 216 to counter 10 will be UP. Note that both inputs to OR circuit 223 can never be UP simultaneously due to the action described previously with reference to the B Function Generator 22 and A Function Generator 24. Similarly, Count-Down line 218 to counter 10 is brought UP whenever a Count-Down command is received on line 201 or on line 209. The OR circuit 231, the delay circuit 232 and the single shot multivibrator 233 act to bring up Count line 217 for a set period after either Count-Up line 216 or Count-Down line 218 to counter 10 is brought UP. Count line 217 is always brought UP for a period shortly after either one of the lines 216 or 218 is brought UP.

The counter 10 is of such design that it is necessary to set a given bit position to "0" before it is set to "1." Still referring to FIG. 5, a delay 234 is provided in the circuit between OR circuit 226 and the Set Bit 1=1 line 219 to counter 10. No such delay is provided in the circuit between OR block 225 and the Set Bit 1=0 line 220 to counter 10. If commands to set the same bit position of the counter to both "0" and "1" are transmitted to the mixer 20, the Set Bit 1=0 line 220 will always come UP a short time before the Set Bit 1=1 line 219 comes UP. These lines are brought up by the corresponding command lines from the B Function Generator 22 or the A Function Generator 24. The lines 219 and 220 are held up for a set interval determined by the single shots 235 and 236. What has just been said with respect to Set Bit 1=1 line 219 and Set Bit 1=0 line 220 applies equally well to Set Bit 2=1 line 221 and Set Bit 2=0 line 222 and all other Set Bit lines. For instance, the delay line 237 in the circuit between OR circuit 227 and Set Bit 2=1 line 221 insures that a signal will appear on Set Bit 2=0 line 222 before Set Bit 2=1 line 221 comes UP, despite the fact that the commands to achieve this result occurred simultaneously. Single shots 238 and 239 serve to hold Set Bit 2=1 line 221 and Set Bit 2=0 line 222 up for a time sufficient to properly set the corresponding bit position of the counter 10.

It is emphasized that statements made with respect to simultaneously occurring commands refer only to commands received from the same function generator and that these originate from the same computer. Though it is possible to receive simultaneous commands from the same one of the Function Generators 22 or 24, it is not possible to receive simultaneous commands from both Function Generators 22 and 24.

If a command is received from one of the Function Generators 22 or 24 on Set All Bits=0 line 206 or Set All Bits=0 line 214 the output of OR block 228 is brought up, bringing up the outputs from OR blocks 225, 230 and all other OR blocks associated with the counter "0" bit positions. Thus an UP pulse on one of the Set All Bits=0 lines 206 or 214 in effect brings up all Set Bit=0 lines from the mixer 20, the ones here being Set Bit 1=0 line 220 and Set Bit 2=0 line 222. Similarly, if Set All Bits=1 line 207 or Set All Bits=1 line 215 is brought up, the output of OR block 229 causes outputs to occur from OR blocks 226 and 227 bringing UP lines Set Bit 1=1 line 219 and Set Bit 2=1 line 221, as well as all other Set Bit=1 lines to counter 10. The output lines 216 to 222 connecting the mixer 20 to the counter 10 thus transmit commands from either one of the Function Generators 22 or 24. The counter 10 will now be described.

Figure 6:
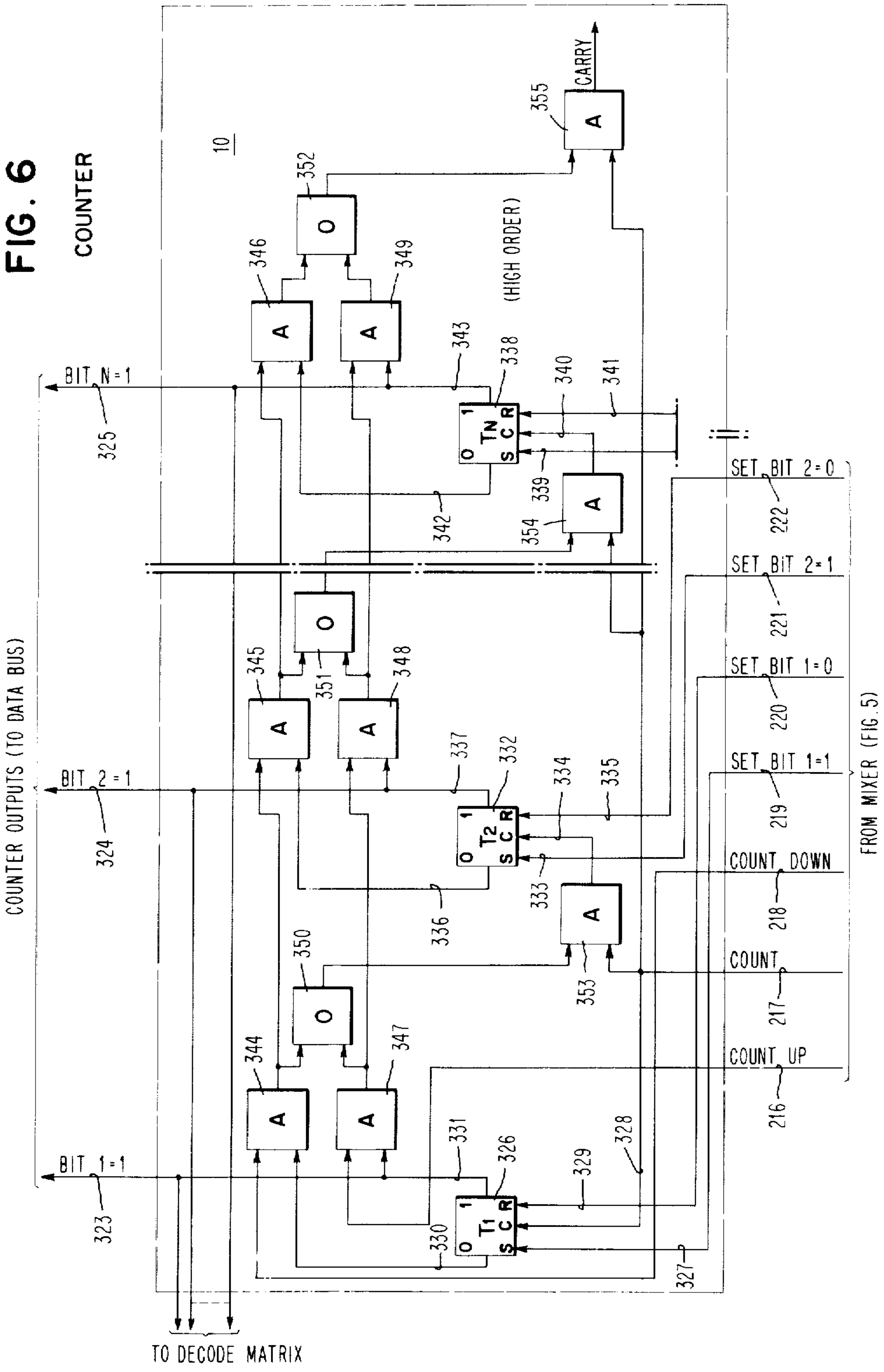
FIG. 6 is a schematic of one device usable as the Counter shown in FIG. 2.

Referring to FIG. 6, there is shown one type of counter useable with the invention described in this application. This counter 10 is of the type which counts in a system having a radix of two, and has inputs as follows: Count-Up line 216, Count line 217, Count-Down line 218, Set Bit 1=1 line 219, Set Bit 1=0 line 220, Set Bit 2=1 line 221, Set Bit 2=0 line 222. These lines are the outputs of the mixer 20 shown in FIG. 5. The outputs of counter 10 are as follows: Bit 1=1 line 323, Bit 2=1 line 324, and as many intervening positions as needed until the final bit position Bit N=1 line 325. Each stage of the counter 10 contains a trigger having set, complement and reset inputs and "0" and "1" outputs. Such a trigger is set to its "0" output by bringing the set input line UP and is set to a "0" output by bringing UP the reset input line. The "0" output line comes UP when the trigger is set to "0" and the "1" output line comes UP when the trigger is set to the "1" output. When the complement input line comes UP, whichever one of the "0" and "1" output lines is UP, is then brought DOWN and the other of the output lines is brought UP. Trigger 326 is provided for bit position 1 of the counter 10, having set input 327, complement input 328, reset input 329, "0" output 330 and "1" output 331. For bit position 2 of the counter 10, there is provided trigger 332 having inputs and outputs 333 through 337 corresponding to the inputs and outputs of trigger 326. The trigger corresponding to the final stage of the counter 10 is trigger 338 having inputs and outputs 339 through 343.

The "0" output lines 330, 336 and 342 of corresponding ones of triggers 326, 332 and 338 are connected to first inputs of respective ones of AND circuits 344, 345 and 346. The "1" output lines 331, 337 and 343 of respective ones of triggers 326, 332 and 338 are connected to first inputs of corresponding ones of AND circuits 347, 348 and 349. Count-Up line 216 provides the second input to AND circuit 347, Count-Down line 218 provides the second input to AND circuit 344. The outputs of AND circuits 344 and 347 provide the second input to AND circuits 345 and 348 which in turn provide the second inputs to succeeding AND circuits until the last stage is reached. Thus there will be outputs from those of AND circuits 344 through 349, a correspondence of UP inputs from a "0" output line or "1" output line and a Count-up line 316 or Count-Down line 318 in that order. OR circuits 350, 351 and 352 are connected to the aforementioned AND circuits 344 through 349 as shown in FIGURE 6. There is an output from OR circuits 350 through 352 whenever there is an output from any of the AND circuits connected to the OR circuits. First inputs of AND circuits 353, 354 and 355 are connected to outputs of corresponding ones of OR circuits 350 through 352. The second input to AND circuits 353 through 355 is provided by Count line 217 which also connects to the complement input 328 of trigger 326. The outputs of AND circuits 353 and 354 connect to the complement inputs 334 and 340 of triggers 332 and 338. The output of AND circuit 355 is a carry which is not utilized in this specific configuration.

Assuming that all of the triggers of the counter 10 are set to "0" the operation of the counter will now be described with reference to FIGURE 6. Due to the circuitry of the mixer 20 the Count line 217 always comes UP for a period after line 216 or 218 comes UP. If it is desired to count UP by one, line 216 is brought UP bringing UP one input of AND circuit 347. Since at this time the trigger 326 is set to "0," line 331 to AND circuit 347 is DOWN and no output occurs from AND circuit 347. Next a Count pulse appears on line 217 which causes complement line 328 to rise bringing UP line 331 of trigger 326. At this time the count pulse on line 217 has no effect upon the other triggers 332 and 338 because the AND circuits 353 and 354 each have one input DOWN. The same is true of AND circuit 355 so that there is no carry. By the time that the "1" output line 331 of trigger 326 has come UP the Count pulse on line 317 has ended so that an output from OR circuit 350 to the input of AND circuit 353 has no effect on trigger 332. The Count-Up line 216 has by this time fallen leaving the triggers in states representing the binary quantity 0 . . . 01 (where " . . . " indicates that a number of bit positions are omitted between the second bit and the highest order bit.)

If another Count-Up level is now applied by means of Count-Up line 216 the AND circuit 347 output brings the OR circuit 356 output UP. The Count pulse on line 217, when it occurs, coincides with the output from OR circuit 350 causing an output from AND circuit 355 to complement the trigger 332 bringing UP "1" output line 337 of the trigger 332. The Count pulse on line 217 also causes trigger 326 to be complemented bringing up "0" output line 330. The counter contents now are equivalent to the binary quantity 0 . . . 10. If still another Count-Up level is applied on line 216 and subsequently a Count pulse on line 217 is applied, trigger 326 will again be complemented bringing UP output line 331 and trigger 332 will remain as it was the "1" output line 337 UP; the counter 10 contents now being representative of the binary quantity 0 . . . 11. If now a Count-Down level is applied on line 218 there will be no outputs from AND circuits 344 and 345 because both triggers 326 and 332 are in the "1" state, zero lines 330 and 326 to the AND circuits bring down. The pulse on Count line 217 causes trigger 326 to be complemented and brings up zero line 330 but causes no other effect on trigger 332 because AND circuit 353 is blocked. Thus, the contents of the counter 10 are equivalent to the binary quantity 0 . . . 10. If another Count-Down level is supplied on line 218 followed by a Count pulse on line 217 the trigger 326 will be complemented bringing UP the "1" line 331 and the trigger 332 will be complemented bringing UP the "0" line 336. The contents of the Counter 10 are now equivalent to the binary quantity 0 . . . 01. The contents of the Counter 10 will be restored to the initial state (0 . . . 00) if another Count-Down level is applied on line 218, followed by a Count puse on line 217.

It is obvious from FIG. 6 that the binary equivalent of the algebraic sum of the Count-Up and Count-Down signals will be indicated by the state sensed at the "1" bit outputs 323 through 325. Regardless of the then existing state of these outputs, the indication may be changed at any time and in any manner desired by bringing UP desired ones of lines 218 through 222 to set any or all of triggers 326, 332 and 338 to the "1" or "0" state.

*Operation of Preferred Embodiment—Example I*

Figure 7A:
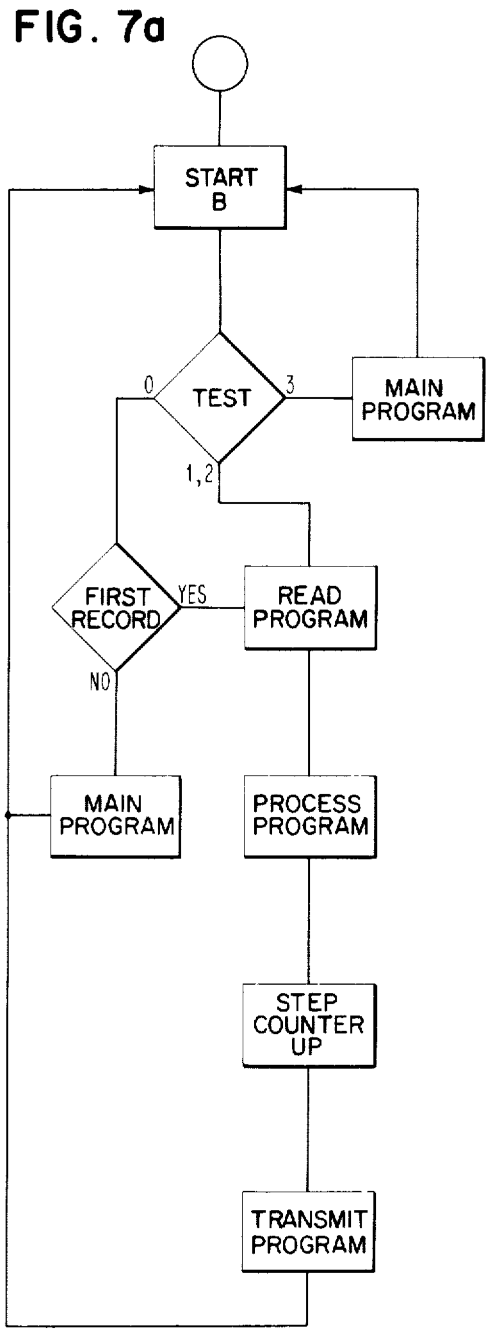
Figure 7B:
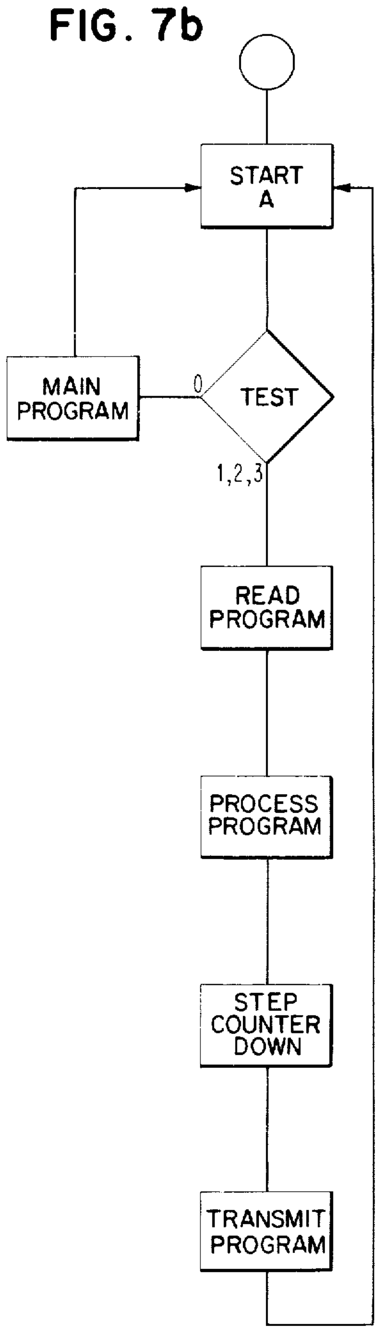

Referring now to the flow diagram shown in FIGS. 7*a* and 7*b*, the operation of the device illustrated in FIG. 2 will be expained by means of a first example. It will be assumed that computer B receives data on data bus connection 2 from some input device such as a tape unit. Further, it will be assumed that computer A transmits data on data bus connection 4 to some output device such as a printer. Computer B and computer A exchange data on data bus 5, and communicate with the counter 10 by means of data bus connection 20 and function request buses 29 and 30.

Each one of the computers B and A contains a main supervisory program of instructions of the type that is usually divided into a number of sub-programs or subroutines for the convenience of the programmer. For instance, one sub-program may refer to input/output operations and another sub-program may refer to the processing of data read by the input/output sub-program. Since the multiplexing of computers is itself a subsidiary routine, the multiplexing operation is controlled by a separate sub-program apart from the main program of computers A and B. Thus, each of computers A and B may execute a main program which contains a problem calling for the multiplexing operation described in this application. When this occurs it is said that the computer is in the "multiplex mode."

Referring to FIGS. 7*a* and 7*b*, there are shown flow diagrams for computers B and A. The boxes labeled Main Program each indicate the programs that are normally in execution in computers A and B. If at some point in the operation of one of the computers a problem occurs which requires the assistance of the other computer, an instruction in the Main Program of the first computer will cause that computer to enter the Multiplex Mode. Subsequently the remaining computer will also enter this mode. For instance, if the Main Program of computer A calls for the solution of some problem that requires the assistance of computer B, a proper instruction indicating this need in the Main Program of computer A will indicate that multiplexing is to occur. It is obvious that proper programming of both computers is required so that the correct sub-programs are available at times that the Main Program requires them. An alternative is to provide for automatic interruption of the Main Program by a condition indicating the need for multiplexing.

In this example, when the multiplex mode is entered: information read from a tape unit into computer B is processed by computer B and then forwarded to computer A for further processing before printing of the information. It is obvious that other input/output devices such as card readers, card punches and paper tape units may be used. Referring to FIG. 7*a* it is assumed that a start B instruction in the Main Program of computer B requests information to be read from a tape unit attached to the data bus 5 in FIG. 2. When the Main Program of computer B calls for a start B instruction, the outputs of counter 10 will be communicated on counter output bus 20 to buffer 6 of computer B by means of data bus 5 and connecting bus 2. The contents of the buffer 6 will be read when line 7 comes UP bringing the single shot multivibrator 8 output 9 UP for a period of time during which further information is prevented from entering buffer 6. If the contents of the counter are 0, which is expected at this time, a First Record test will be made. This test is used to initiate operation in the Multiplexing Mode and merely checks to see if information is present on the data bus 5. Since it was desired to read information into computer B from a tape unit on bus 5, it is obvious that the Main Program should have contained an instruction to enable reading from a tape unit onto bus 5 and that therefore the First Record test will be positive. If there was an error in programming, then no data will be present on the data bus 5 and the Main Program will be re-entered. In such a case, if the Main Program contains proper instructions for processing, it may reinitiate the multiplexing sub-program at a later time or it may conduct an error check to determine the cause of failure of data to appear on the data bus 5. However, since the data bus 5 does contain information, a Read Program is entered.

The Read Program is a sub-routine in the multiplex mode which is used to read information on the data bus line 5 from a tape unit into the memory of computer B. This sub-program is designed to read data from data bus 5 serially at such proper times as when the computer B is ready to receive information. Depending upon the design of computer B, the Read Program may permit interleaving of Main Program steps with the Read Program sub-routine. However, this is not essential to the invention, it only being necessary that the program transfer data from the tape unit to the memory of computer B. There are instructions in the Read Program which operate line 7 to properly control the buffer 6. It will be noted in this example that since data is read into computer B from a tape unit, the data will be entering in a tape code which does not necessarily conform to the computation code of computer B. Thus when a predetermined record length of data is read into computer B, a Process Program is initiated.

The Process Program is a sub-routine which handles data within computer B to transform it as required and store the results in certain result fields. In this example it is assumed that the Process Program converts the tape code format to whatever code the machine uses, performs certain arithmetical calculations upon the transformed data and then stores the results in three fields in memory. One field in memory is filled each time that the Process Program is called upon for execution. The Process Program may be of any sort and may be of any length required by the particular data being processed. This program is the central function of computer B, it performing a portion of the solution of the problem solved by both computers B and A together.

Whenever the Process Program has filled one field with results, a B function Count-Up request is transmitted from computer B on bus 29 to the B function generator 22. At a time determined by pulse generator 25, Use B line 27 will come UP causing B function Count-Up and Count commands to appear on bus 21. The mixer 20 causes Count-Up line 11 and Count line 12 to come UP. Since the counter contents at this time are not all "1," the AND gate 36 will permit both Count-Up line 11 and Count line 12 to operate the counter 10, increasing the counter by 1. When this has occurred a Transmit Program is entered.

The purpose of the Transmit Program sub-routine is to transfer data from those result fields of the memory of computer B that are filled to the data bus 5. The Transmit Program is related to the Read Program previously mentioned in that it also is an input/output routine which may contain instructions permitting interleaving of Main Program instruction steps and transmission instructions. The Transmit Program will not transfer information to the data bus 5 if the bus 5 is busy. Thus if information is entering the data bus 5 from a tape unit, either one of the computers A or B, or information is received from any other source, the Transmit Program will not proceed. The Transmit Program may automatically resume when the data bus 5 is empty or it may wait until the Multiplex Program loop shown in FIG. 7*a* is run through once more. In either case, the Transmit Program will empty fields in the memory of computer B which are filled at this time. Thus if one field was filled by the first run-through of the multiplex loop, then the Transmit Program will transfer this field to the data bus 5.

One loop of the Multiplex Sub-program of computer B has been described with reference to FIG. 7*a*. Another loop is executed once the data stored in the three memory result fields of computer B has been transferred to the data bus 5 by the Transmit Program routine. A test is again conducted to determine the state of the counter 10, by means of a test instruction which brings the counter contents to the buffer 6 via buses 20, 5 and 2. If the contents of the counter 10 are zero, then a First Record test is conducted and the Main Program is re-entered if no data is on bus 5. Also, if the contents of the counter 10 are three, the Main Program is re-entered. In this case, however, the contents of the counter 10 are known to be one, the Read Program and Process Program are again run through as explained above. The counter is stepped UP at the end of the Process Program and the Transmit Program is re-entered. This routine continues until all the data that is to be processed has been completely handled.

At this point the Multiplex Mode of computer A will be explained. The flow diagram for computer A appears in FIG. 7*b*. The operation of the Multiplex Sub-program for computer A is practically identical to that of the Multiplex Sub-program of computer B with the exception that the data read from data bus 5 comes from computer B and not from a tape unit and that the data transmitted onto data bus 5 is transmitted to a printer instead of to a computer. It is not necessary that the data sent onto data bus 5 be transmitted to a printer, however, this will serve to explain the operation of this first example.

The Main Prgram of computer A contains instructions which start operation of the Multiplex Sub-program at a time related to the starting of the same program in computer B. This synchronization can be obtained in many ways. One convenient way is to have an instruction in the Main Program of computer A which tests the counter 10 to determine whether its count is other than zero. Thus, if the Main Program of computer B has started a Multiplex Sub-program causing the counter 10 to be stepped up, then the Main Program of computer A will initiate a Multiplex routine. Similarly, the reverse operation is possible: the Main Program of computer B may contain instructions which examine the counter 10 contents to test whether computer A has called for the Multiplex Mode. This will be understood when it is remembered that the flow diagrams of FIGS. 7*a* and 7*b* show only a particular Multiplex routine called for by the computers and that any combination of counter step-up and step-down commands by either computer is possible. Apparatus permitting automatic interruption of the Main Program by the counter 10 stepping above zero may be provided.

When computer A enters the Multiplex Mode a test of the counter 10 contents is conducted. If the contents of the counter 10 are zero, the Main Program is re-entered and maintained until proper instructions in the Main Program either restart the Multiplex Routine, continue the Main Program or take such other action as was planned by the programmer for this situation. Assuming that the Main Program of computer A initiated the Multiplex Program only after testing the counter 10 for a count of more than zero, then the test will result in initiation of a Read Program.

The Read Program enters information received from computer B on data bus 5 into three fields in the memory of computer A corresponding to the three result fields in the memory of computer B. Since the aforesaid Process Program of computer B converted the tape format to computer B machine format, the Read Program of computer A will enter the data from data bus 5 in computer B machine format. The Read Program examines data bus 5 to determine whether it is busy before proceeding to read. Thus, it is possible that steps of the Main Program will be interspersed with stops of the Read Program in the event that the data bus 5 is busy. Further, since it is conventional to combine input/output operations, it is possible that portions of the Transmit Program of computer A, to be described below, will also be interspersed with steps of the Read Program. When the Read Program of computer A is completed, a Process Program is entered.

The Process Program of computer A may be of many types; for example, it may process information received in computer B format to change it to a form which can be utilized by a printer. Also, the Process Program may edit the information received from computer B to insert punctuation marks and spaces in order to supply a readable print-out. The Process Program enters the results of its computations into the memory of computer A after processing one of the three fields read by the Read Program from the data bus 5. At the completion of the Process Program the counter 10 is stepped down.

The counter 10 may be stepped down by computer A by an instruction at the end of the Process Program, causing an A function request on bus 30 to enter the A function generator 24 resulting in an A function command on bus 23 which leaves the mixer 20 on Count line 12 and Count Down line 13. Since the contents of the counter 10 at this time are not all zeros the AND gate 35 permits the Count Down line 13 signal to reach the counter 10. Thus, at a time determined by the pulse generator 25 and the inverter 26, the counter 10 will be counted down by one. Since the Process Program processes one field read by the Read Program at a time, the Count Down line 13 will be brought UP once for each field processed by the Process Program. The Transmit Program is then entered.

The purpose of the Transmit Program is to transfer from computer A to the data bus 5 and then to a printer data stored in memory by the Process Program. The Transmit Program will transfer information from computer A only when the data bus 5 is not busy. The Transmit Program empties the memory positions filled by the Process Program in the last loop of the Multiplex Sub-program of computer A. This may, as explained previously, be interspersed with steps of the Main Program or the Read Program or other programs. At the conculsion of the Transmit Program the Multiplex Sub-program is re-entered as shown in FIG. 7*b*. If the counter 10 has been counted down to zero, the Main Program is entered and continues until proper instructions restart the Multiplex Mode of computer A. If the counter 10 contains more than zero, the Multiplex Sub-program of computer A repeats itself again.

The interrelation of the Multiplex Modes of computer B and computer A will now be described with reference to the flow diagrams of FIGS. 7*a* and 7*b* and the apparatus shown in the diagram of FIG. 2. From the above descriptions it is obvious that for each field processed by the Process Program of computer B the counter 10 will be stepped up by one. Further, for each field transferred to computer A and processed by the Process Program of computer A the counter 10 will be stepped down by one. The Read Program of computer B is entered only when the contents of the counter 10 are other than zero or three and the Read Program of computer A is entered only when the contents of the counter 10 are more than zero. This prevents either computer from overrunning the other. Thus, if the three processing fields of computer B are filled it would be undesirable to enter the Read Program of computer B which just puts more data from the tape unit into computer B. Each field filled by the Process Program of computer B increases the counter 10 by one. If the three fields of the memory are filled by the Process Program, the counter 10 contents will be three. For each one of these three fields transferred to the computer A by the Read Program and Transmit Program of computers A and B respectively, the counter 10 will be stepped down by one, after the field is processed by computer A. Even though the memory fields are transferred from computer B to computer A the counter 10 is not stepped down until the data in these fields is processed in computer A.

The reason for this is evident when it is considered that no purpose is served in transferring data to computer A if it cannot process the data. The counter 10 will be stepped down only for fields transferred from computer B to computer A that are also processed by computer A.

The Read Program of computer B will enter information from data bus 5 into the memory of computer B whenever the computer A has removed information from the memory of computer B reducing the count to less than three but more than zero. If computer B for some reason runs much faster than computer A, computer B will fill up its three memory fields by means of the Read and Process Programs and step the count to three before computer A has had time to process this information. The time it takes to transfer the information from computer B to computer A is irrelevant since the counter 10 is not stepped down until after processing of the data by computer A. If at some later time computer A processes one of the three fields the counter 10 will be stepped down permitting the computer B to fill the third field again. Computer B may at this time be in the Main Program and depending upon the planning of the programmer may enter the Multiplex Sub-program at any time to read this data from the data bus 5.

On the other hand, if computer A is much faster than computer B the count of the counter 10 will be reduced to zero frequently. For example, if computer B has time to enter only one field of the data in its memory, and computer A processes this data before computer B has time to enter a second field of data, the counter 10 count will be zero. In the event that this occurs the Main Program of computer B will re-entered until such a time as the programmer has planned to restart the Multiplex Sub-program of computer B. Note that the First Record test, FIG. 7*a*, is used only to initiate the Multiplex Sub-program of computer B. When the counter 10 goes to zero, computer A also enters its Main Program because no data remains in the memory of either computer B or computer A to be processed. Again it is the programmer's choice when to re-enter the Multiplex Sub-program of computer A.

In summary, it is clear that the counter 10 may be used to synchronize the simultaneous operation of computer B and computer A irrespective of the relative computational speeds of the computers and the complexity of their programs. The counter 10 prevents either computer from overrunning the other computer and permits convenient interleaving of Main Program execution with the processing of and the transfer of information from a tape to a printer. The purpose of this example was to present the principles of operation of the counter 10 in conjunction with the computer B and computer A. A more general example illustrating bilateral flow between computers A and B will now be described.

*Operation of preferred embodiment—Example 2*

Referring now to the flow diagrams shown in FIGS. 8*a*, 8*b*, 9*a* and 9*b*, a second more general example of the operation of this invention will be described. This example illustrates the operation of the invention in the solution of a problem which may require the cooperation of computer A and computer B at certain prespecified points. Computer A may request the assistance of computer B in solving a portion of a number of independent problems simultaneously with the solution of remaining ones of the problems by computer A. The reverse situation where computer B requests the assistance of computer A in solving independent problems is also possible. Independence of problems means that results obtained by any one of a number of simultaneous solutions do not depend upon the results obtained by any others of the simultaneous solutions. In other words, the data required is known at the time assistance is required and no other data need be supplied by any of the results obtained from the simultaneous solutions.

Figure 8A:
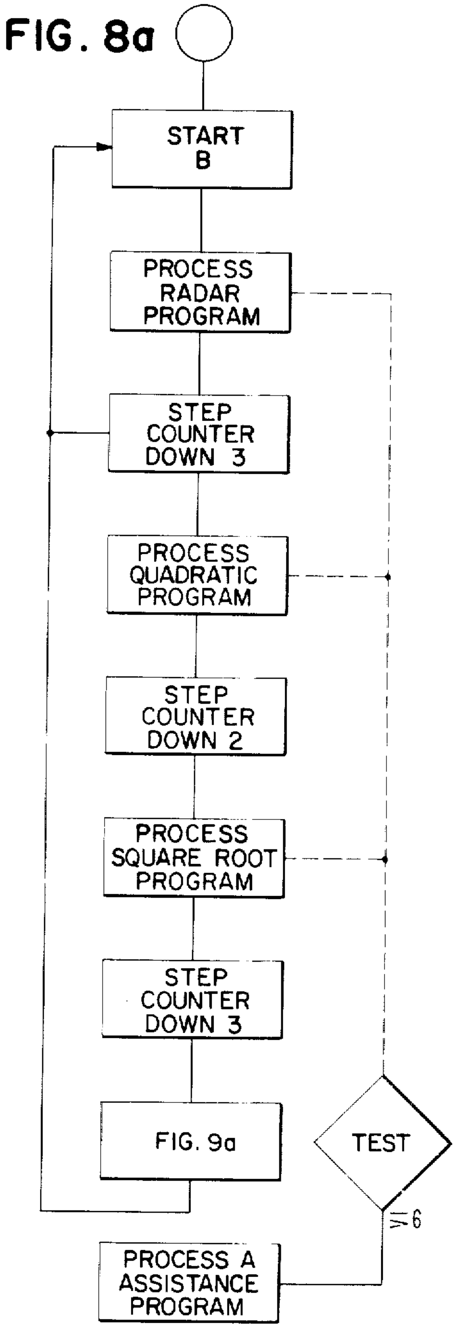

For purposes of illustration it will be assumed that the problem to be jointly solved by computer A and computer B is one involving direct data obtained from an external source such as a radar receiver. The information received from a radar receiver enters computer B by means of data bus 5 and input bus 2 to buffer 6, shown in FIG. 2. The radar data is placed into the memory of computer B by means of a Read Program of the type previously described with reference to example 1. The radar data is processed as shown in FIG. 8*a* by a Radar Program which convert the radar signals into any of a number of useful forms. For instance, if the radar data enters computer B in the form of angle and distance measurements (polar coordinates) it may be converted into X and Y data (rectangular coordinates) which are more easily solved by standard computer techniques. This data may be further processed by a Quadratic Program which solves quadratic equations for each record of radar data entered into computer B. For example, the Quadratic Program may solve the future position of an object represented by the radar data. Further processing may involve a Square Root program as shown in FIG. 8*a* or any other necessary calculations.

Up to this point the processing accomplished by the programs of computer B are of the type where each result is dependent upon the results of the programs prior to the present one. Since these results are dependent, it would not be convenient to transfer one of the programs to computer A for simultaneous solution because computer B would then have to wait for computer A to reach its result before computer B could proceed with its programs. It should be understood that there is no reason for not transferring dependent sections of a problem to computer A since the techniques of this invention permit optimum solution time and reduce the waiting time of computer B. However, for purposes of this example, it is assumed that the only independently programmed problems are transferred to computer A for purposes of simultaneous solution.

Figure 8B:
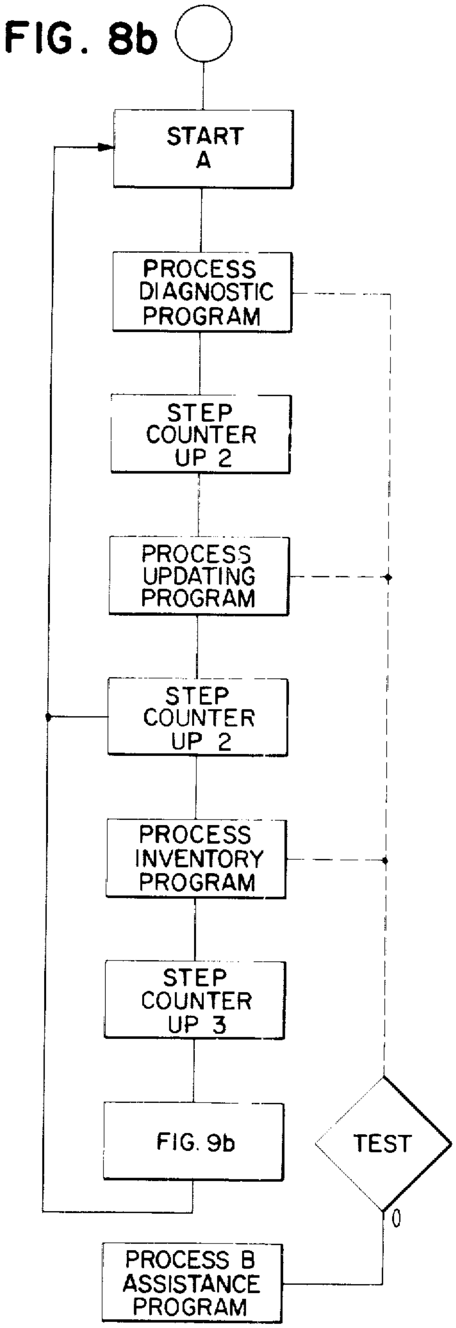
Figure 9A:
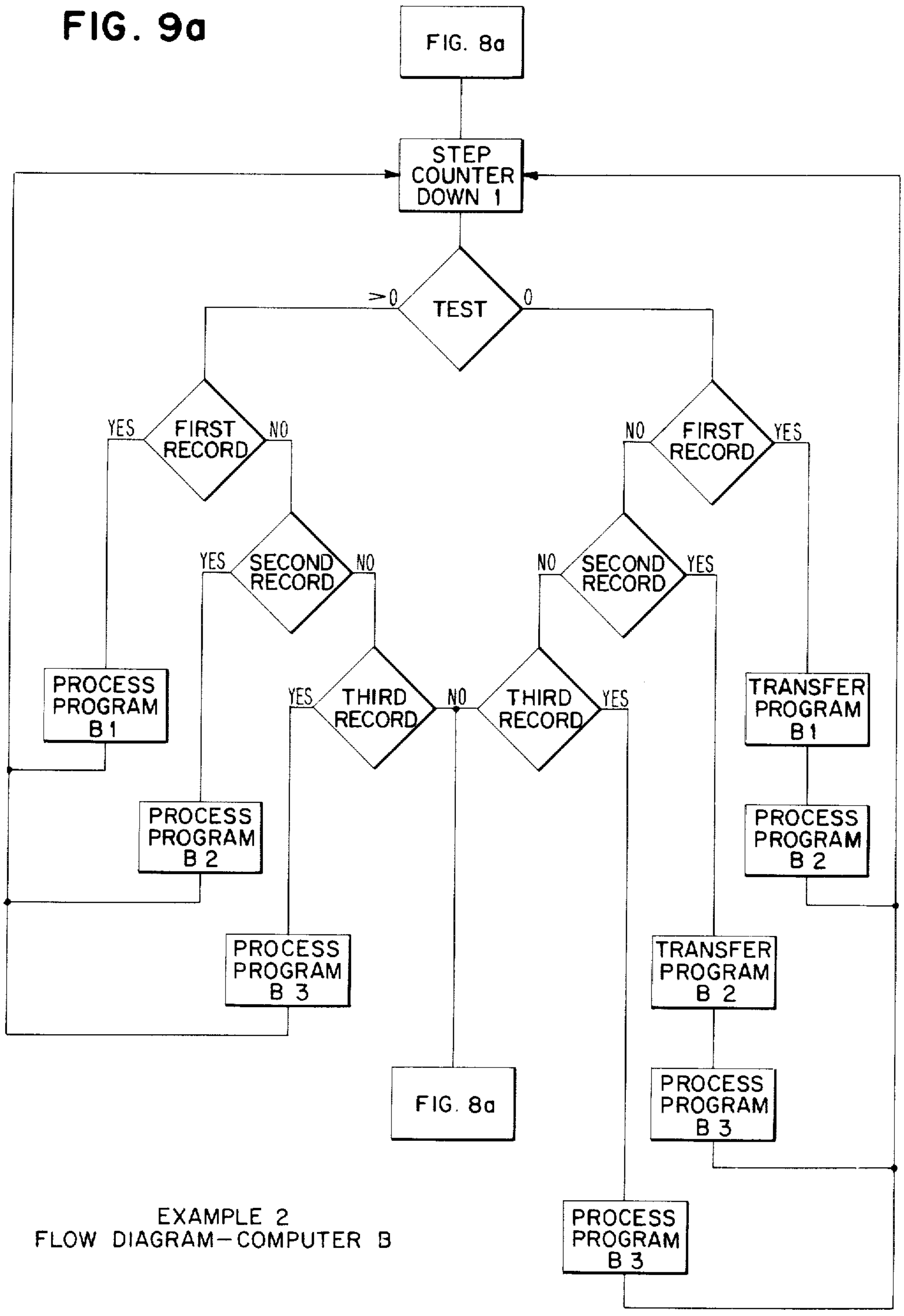

As shown in FIG. 9*a* (which shows the details of the box labeled "FIG. 9*a*" in FIG. 8*a*), the results obtained in the processing of the Square Root Program are processed by a number of separate independent programs B1, B2 and B3. These programs may include iterative solutions, each based upon the results obtained by the processing of the Square Root program and each obtaining results dependent only upon the results obtained in the processing of the Square Root Program. Since each one of the programs B1, B2 and B3 is dependent only upon the same data, the results of the processing are independent. There is a time saving if programs B1, B2 and B3 are processed simultaneously instead of sequentially. The apparatus of this invention permits computer B to call upon computer A to assist in the processing of any one of the programs B1, B2 or B3 by means of the B Assistance Program shown in FIG. 8*b*. The point at which assistance is rendered is determined by the counter 10 shown in FIG. 2; the point being determined by several factors to be explained below.

Figure 9B:
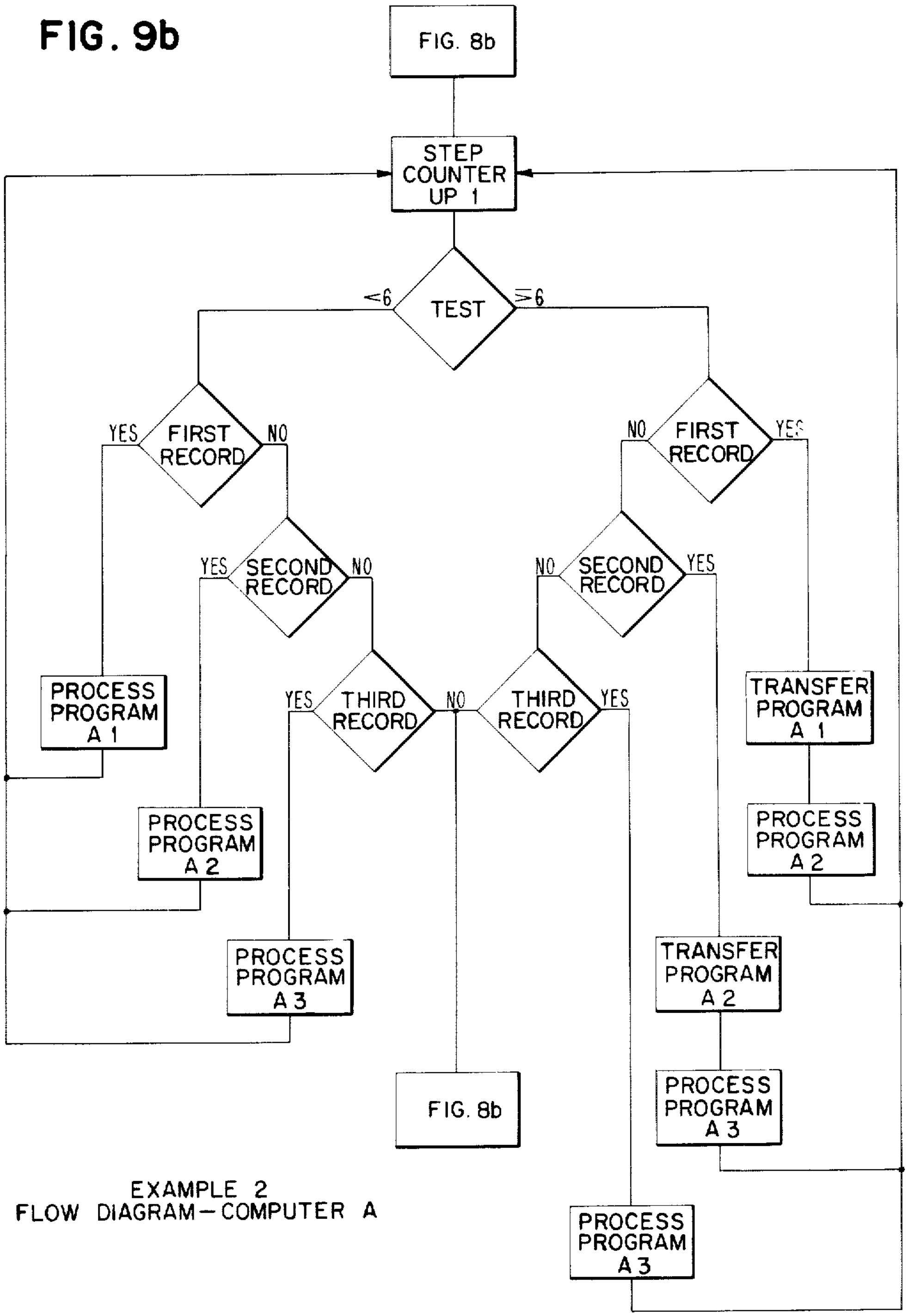

What has been said about computer B applies equally well to computer A. Computer A may contain programs for processing exactly the same sort of data that computer B processes and computer A may call upon computer B to assist it in the simultaneous solution of certain portions of this problem. In this example computer A contains a program of instructions slightly different from that of computer B. As shown in FIGS. 8*b* and 9*b*, computer A normally processes Diagnostic and Updating Programs which maintain computer A in an operable state and change the memory contents of computer A to correspond to changes in conditions. Computer A may also process an inventory program which need not be directly related to the solution of the radar problem. For instance, if it is necessary to process time cards, work cards or paychecks for the radar facility, computer A may be used for this purpose. Data processed in this manner may require certain iterative solutions, each independent of the others but dependent upon the same inventory data processed by the Inventory Program. The apparatus of this invention provides means for permitting computer A to request computer B to solve some of these iterative problems simultaneously with the solution of others by computer A. Therefore, at a point determined by the counter, computer B is interrupted and computer A tranfers certain of the programs A1, A2 or A3 to computer B which will, by means of the A Assistance Program, process one of these simultaneously with the solution of another by computer A. Once the requested processing is completed, the interrupted program may continue from the point of interruption, or it may be restarted, or all programs in the computer may be restarted. In the latter two cases, if there were no counter, it would not be possible to determine the amount of repetition required by an interruption. The counter takes into account the need for, as well as the consequences of, interruption.

Computer B may process radar data directly from a radar receiver while computer A processes Diagnostic and Updating programs at the same time. If some unusual solution of a more lengthy nature is required, such as iterative programs, then either computer may call upon the other to take over a portion of the solution simultaneously. The normal programs processed by respective ones of computer B and computer A have different priorities. The Radar Program of computer B should rarely be interrupted to aid in the solution of a computer A problem because radar data would be lost if computer B is taken off the line connecting it to the radar receiver. On the other hand, the processing of Diagnostic and Updating programs in computer A may be interrupted for purposes of aiding in the solution of a computer B problem since these programs are not of the sort which would result in the loss of data if an interruption is caused. The relative priorities of these programs is given effect, as shown in FIG. 2, by instructions which step the counter 10 through the B function generator 22, A function generator 24 and mixer 20 as previously explained with reference to Example 1. These instructions count the counter up or down a number of times for each record processed by a program. Thus each time a record is processed by the Radar Program, the counter 10 is counted down three times, whereas for each record processed by the Diagnostic Program the counter 10 is stepped up only twice. If the counter was initially at zero, one repetitive loop of the Radar Program will increase the counter to three. If simultaneously a Diagnostic Program was processed in computer A, the counter will be stepped up by two. The net change will be minus 1. In effect computer B has stepped the counter down once. Thus the relative priorities of the Process and Diagnostic Programs are given effect. Similarly at the completion of the Quadratic Program the counter is stepped down twice, and at the completion of the Square Root Program the counter is stepped down three times. In computer A at the completion of the Updating Program the counter is stepped up twice and at the completion of the Inventory Program the counter is stepped up three times. Assuming a straight run-through from Start B to the Square Root Program, the counter will have been stepped down a total of eight times. Simultaneously computer A (assuming that it has run through a complete set of programs from Start A to the Inventory Program) will have been stepped up seven times. Thus computer B will have decreased the counter one more than the computer A has increased it. In this manner the relative priorities, lengths and complexities of all the programs in the computers B and A are given effect. It is to be noted that computers B and A may contain instructions which change the relative priorities even though the problems remain the same. The particular values of counts shown in FIGS. 8*a* through 9*b* are for the purposes of this example only. Instructions may preset the counters also. It will be evident from the explanation above that the likelihood of interruption of a program in one computer by the other computer is dependent upon the relative progress made in the execution of the programs in the computers.

The counter contents are tested by computers B and A to determine their value as explained in Example 1. The critical values in this example are zero and six. If the contents of the counter are zero, then the computer A will be called in to assist computer B in the solution of the problems outlined by programs B1, B2 and B3. If the contents of the counter are equivalent to the value six, then the computer B will be called in to assist computer A in the solution of problems to be processed by the programs A1, A2, and A3. If the contents of the counter are between 1 and 5, then each computer will continue processing its own programs.

Referring again to FIG. 8*a*, the flow diagram will be explained. When computer B is started the Radar Program will be entered. The Radar Program processes data received from a radar unit and places the results in predetermined locations in the memory of computer B. If the counter contents equal six, the Radar Program may be interrupted and the A Assistance Program entered.

The A Assistance Program in computer B processes data transferred to computer B from computer A for the purpose of aiding computer A in the simultaneous solution of independent programs. The interruption of the Radar Program by computer A is automatic and may occur at any time after the contents of the counter equal six. Since it is undesirable to lose radar data by interrupting the Radar Program, the counter may be set to an initial value by instructions in the Radar Program. This may occur so that it will not be possible for computer A to interrupt the Radar Program at critical points. Whenever the processing of a radar record is completed the counter is stepped down by three. The object of stepping the counter down three times is to put the counter contents at such a value as to bring the relative priorities of computer B and computer A into effect. Thus the relative speeds of execution of programs in computer A and computer B may be monitored. The usual step following the decreasing of the counter by three is to re-enter the Radar Program. This is shown in FIG. 8*a* by the line connecting the box labeled Step Counter Down Three and the box labeled Start B. Computer B may continue to process radar data until it is necessary to enter another program. The instruction needed to change from a closed loop to a new program may be contained in the Process Program or it may be external. An example of an additional program is the Quadratic Program.

A Quadratic Program handles data processed by the Radar Program, transmitting results to a specified area in the memory of computer B. The data read and processed by the Radar Program should be in the form of quadratic equations in order to be processed by the Quadratic Program. After the Quadratic Program is processed the counter is stepped down by two, the total decrease being three times the number of Radar Program repetitions plus two. The Quadratic Program may be interrupted by computer A in the same manner as computer A was able to interrupt the Radar Program. There may be an instruction in the Quadratic Program indicating that an additional computational program is required for further processing of the results obtained in the Quadratic Program. An example of such a further program is the Square Root Program.

The Square Root Program extracts square roots of the results obtained in the Quadratic Program and stores these roots in specified places in the memory of computer B. The counter is stepped down by three for each repetition of the Square Root Program. Thus the counter will have been stepped down three times the number of repetitions of the Radar Program plus five. The Square Root Program may be interrupted by the computer A in the same manner as the Radar and Quadratic Programs. After the counter has been stepped down by three, the programs B1, B2, and B3 are entered.

Referring to FIG. 9*a* (which shows the details of the box "FIG. 9*a*" in FIG. 8*a*), each of the programs B1, B2, and B3 handles data which was obtained as a result of the Square Root Program performing arithmetic computations upon the data to form three sets of results, one for each of the programs. Thus program B1 may repeatedly add the results obtained by the Square Root Program, program B2 may repeatedly subtract the Square Root Program results, and program B3 may combine addition and subtraction of the results obtained by the Square Root Program. Without multiplexing, computer B would have to process programs B1 through B3 sequentially since only one program may be processed by a computer at one time. Programs B1, B2, and B3 can be processed simultaneously, if facilities to do this are available, because the problems are independent of each other. The B Assistance Program shown in FIG. 8*b* is provided to permit computer A to take over the processing of one or more of programs B1, B2, and B3 while computer B simultaneously processes the remaining ones. The B Assistance Program is called upon the transfer and process programs B1, B2 or B3 when the counter contains a count of six.

In FIG. 9*a*, the counter is stepped down one and is then tested to determine the value of its contents in a manner similar to that explained with reference to Example 1. If the contents of the counter are more than zero, the first process program B1 is processed by computer B. The first record test is positive, no other ones of the programs B1, B2 or B3 having been previously processed. If the counter contents are zero, program B1 is transferred to computer A via the bus 5 where it will be executed by the B Assistance Program. Since the transfer of program B1 occurred when the contents of the counter were zero, it is obvious from FIG. 8*b* that whatever program is being executed in computer A will be interrupted in favor of the B Assistance Program by a Test indication of zero. The next program in computer B, program B2, is processed simultaneously with the execution of the program B1 in computer A. At the conclusion of processing of the program B2, the counter is stepped down by one again and another test is conducted.

Thus it is seen that for each execution of one of programs B1, B2, or B3 by computer B, the counter is stepped down by one and a new contents test is conducted. Program B1 or B2 may be transferred to computer A for solution if the counter has been counted down to zero at any time before a test is conducted. Execution of one of the transferred programs does not affect the count of the counter. As an example: if the counter is set to one, the first record to be processed will be processed by program B1 of computer B. Successful processing of program B1 will result in the counter being stepped down by one, putting it at zero. If the programs being processed by the computer A at this time do not increase the counter before a test of the contents is conducted, then the next test will indicate that the contents are zero. The second record to be processed by program B2 will be transferred to and executed by computer A, while program B3 is simultaneously processed by computer B. At the conclusion of the execution of program B3 the counter will again be stepped down. Since this will be the fourth record it is irrelevant whether the test is zero or more than zero because in either case the computer B is restarted as shown in FIGS. 9*a* and 8*a*.

Referring now to FIG. 8*b*, starting of computer A will result in the execution of a Diagnostic Program which checks computer A for troubles. This program may be interrupted for the purpose of assisting computer B in the execution of programs B1, B2, and B3, sometime after the counter goes to zero. At the conclusion of the processing of the Diagnostic Program the counter is stepped up by two and an Updating Program is entered.

The Updating Program of computer A is used to conform data contained in the memory of computer A to situations that change with time. The Updating Program may be interrupted whenever the counter goes to zero as explained previously. At the conclusion of the Updating Program the counter is increased by two and either the Diagnostic Program is re-entered or an Inventory Program is initiated.

Normally the Diagnostic and Updating Programs are alternately executed. At special times it may be necessary to use computer A for processing information used to prepare paychecks, etc. In such cases the Inventory Program is entered and the counter is stepped up by three for each record executed. The Inventory Program may be interrupted if the counter goes to zero, as explained above. Since the counter is stepped up by two immediately preceding the execution of the Inventory Program and was stepped up by two previously, it would be necessary for computer B to count the counter down by at least four before the Inventory Program can be interrupted. Thus the likelihood of interruption decreases as a computer progresses through its programs. This is desirable in problems where an interruption requires the solution to be restarted. The independent programs A1, A2, and A3 are entered after the counter has been stepped up by three.

Referring to FIG. 9*b*, there is shown a detailed flow diagram of the contents of the box labeled "FIG. 9*b*" in FIG. 8*b*. The flow diagram of FIG. 9*b* is identical to that shown in FIG. 9*a* with the exception that it illustrates the execution of three independent programs associated with computer A rather than with computer B. It is possible for computer A to transfer programs A1 or A2 to computer B for simultaneous processing with untransferred programs by computer A. For example, if the contents of the counter are set at five, the first record processed by computer A will be processed by the execution of program A1 by computer A. After the successful conclusion of the processing of program A1, the counter will be stepped up by one, causing the counter to increase to six. The second record will be processed by program A2 which will be executed by computer B rather than by computer A while computer A processes program A3 simultaneously. At the conclusion of the processing of program A3 by computer A, the counter will again be stepped up by one. At this point it does not matter what the contents of the counter are since more than three records will have been processed and the computer A will be restarted as shown on FIGS. 8*b* and 9*b*.

In summary it can be seen that the computers A and B process various dependent and independent programs. The relative priorities of these programs are determined by the amount that the counter is stepped at the conclusion of a program. The more the counter is stepped the less the possibility that the next program to be processed by a computer will be interrupted by the other computer.

The interrelation of the flow diagrams shown in FIGS. 8*a* through 9*b* will now be discussed. The counter may contain any count between zero and six. The count of zero has arbitrarily been chosen as the point at which computer B may call upon computer A for assistance in executing certain specified programs of computer B. The count of six has arbitrarily been chosen as the point at which computer A may call upon computer B for assistance in the execution of certain specified programs in computer A. When the counter contains counts from one through five, computers B and A simultaneously execute their own programs. Computer B counts down the counter and computer A counts up the counter after the execution of certain programs. The amount that any particular program of a computer counts the counter up or down is determined by the priority given to that program. Since the limits zero and six of the counter cause interruption of programs, the amount that the counter is counted up or down is important in determining whether a program will or will not be interrupted. Any program may be interrupted by the other computer, but the chance of interruption depends upon the relative priorities of these programs. Thus, as has been said before, though the Radar Program of computer B is an important one, it is possible that after initiation of the Inventory Program of computer A it may be more important to process the programs A1, A2 and A3 than the Radar Program. The relative importance of processing one program over the other depends on what has been processed by a computer before. Thus if computer B has been doing nothing but processing the Radar Program for a given period of time while computer A has processed Diagnostic, Updating and Inventory Programs, it may not be detrimental to interrupt the Radar Program. Though information is lost due to interruption of the Radar Program, the amount of information lost is negligible compared to the total amount read. The counter permits logical decisions to be made automatically.

The Radar Program may contain an instruction which forces the counter to assume a given count. In such a case if the counter is stepped down by three at the conclusion of the Radar Program, it will not be stepped down cumulatively, rather it will be stepped down the same amount no matter how many repetitions the Radar Program runs through. Therefore, if the computer B is circulating through the Radar Program and the computer A is running through all its programs in a linear fashion, computer A will at some point have precedence over the Radar Program of computer B. This point is determined whenever computer A has counted the counter up enough to offset by six the amount that computer B counts the counter down. This occurs, assuming that the counter was initially set at zero, when the computer A has counted the counter up by nine, if the Radar Program is executed, or when it has been counted up by six before the Radar Program is complete.

If the Radar Program contains an instruction resetting the counter to one, and if the Inventory Program in computer A is executed before the conclusion of the Radar Program, then the counter will also be at six. When the flow diagram of FIG. 9*b* is entered, a further step up of the counter will still cause the Test to indicate six. The Radar Program of computer B will then be interrupted, the first record being executed by the A Assistance Program of computer B, in accordance with program A1, while program A2 is simultaneously executed by computer A. On the other hand, if computer A is processing a loop including the Diagnostic and Updating Programs, computer B may obtain precedence over computer A and interrupt either one of these programs whenever the count of the counter is zero, if the counter is counted down towards zero faster than computer A counts the counter up. If the Diagnostic and Updating Programs contain instructions setting the counter to some initial condition before each loop, then the counter will not be cumulatively increased by the step counter up by two instructions. The counter will be increased by two for each run-through of the Diagnostic and Updating programs but it will be reset to the initial contents thereafter. Even if no such instruction exists in the Diagnostic and Updating programs, there being cumulative counting of the counter, computer B may still interrupt the programs of computer A if it counts the counter down faster than the computer A counts the counter up. As long as computer B counts down faster than computer A counts up, some point will be reached where the counter will go to zero and, as shown in FIG. 9*a*, computer B will be able to transfer a number of the programs B1, B2, and B3 over to computer A. Thus it is seen that the computer which is changing the counter the faster will be able to transfer to the other computer a portion of its problem. It is to be noted that the only programs selected for transmission to the second computer in this example are the programs A1, A2, B1, and B2. Additional such programs may be provided however and may be assigned different priorities for transmission.

Note that the programs of computers A and B are not interrupted for assistance purposes until the program requiring assistance is reached. Thus the count of the counter may reach six during the processing of the Radar Program in computer B without interrupting computer B if the program being executed at this time in computer A is the Inventory Program. However, when the programs A1, A2, and A3 are reached in computer A, whichever program is being executed in computer B at this time will then be interrupted.

The computer that is processing data the faster, due to the inherent characteristics of the computer or the simplicity of its program, is not necessarily the one that will get precedence and obtain assistance for the execution of its programs. The priority is determined not only by the speed of execution but also by the amount that the counter is stepped at the completion of each program. Thus a long complicated program may have more effect on the counter than a simple short program because the counter may be stepped many more times for the complicated program than it is for the simple program. If the lengths of the programs and the priorities of computer B are such that computer B steps down the counter more often than computer A steps up the counter, then when the programs B1, B2 and B3 are reached, computer B will be able to obtain the assistance of computer A in processing these programs. On the other hand if the programs and priorities of computer A are such that computer A counts up the counter more often than the computer B counts down the counter, then computer A will be able to obtain the assistance of computer B in processing the programs B1, B2, and B3. Further, the relative speeds of computers A and B do not alone determine the likelihood of the counter actually reaching zero or six because instructions may be provided within any programs or at the start of a series of programs (indicated by the Start B and Start A blocks in FIGS. 8*a* and 8*b*) that initialize the counter at some value or the other. For instance, the counter may be initialized at a count of zero at the start of processing by computer B. This does not necessarily interrupt any programs in computer A because no interruption can occur until the programs B1, B2, and B3 are reached. Similarly, at the start of processing by computer A the counter may be initialized at a value of six. The counter may fluctuate between values of zero and six without ever causing either computer to assist the other if the fluctuations are not concurrent with the execution of programs B1, B2, B3, A1, A2 and A3.

The counter should not count outside the limits set by the quantities zero and six. The counter is prevented from counting below zero by the elements associated with the decode matrix 30 in FIG. 2. The counter may count above six but such a count will have the same effect as six if all of the outputs for six and above are connected together.

Two examples of the operation of the apparatus of this invention have been described. Many combinations of multiple computers and counters for the purpose of decreasing the time required to solve complex problems are possible. It is evident from the flow diagrams of FIGS. 8*a* through 9*b* that any number of variations in programming may be planned, permitting a large array of applications of this invention.

While the invention has been particularly shown and described with reference to a preferred embodiment thereof, it will be understood by those skilled in the art that the foregoing and other changes in form and details may be made therein without departing from the spirit and scope of the invention.

In the claims:

1. Apparatus for the solution of problems by multiple computers including: a first and a second computer each for processing data manifestations in accordance with programs of instruction manifestations and each including means for executing the programs, bi-directional counting means operable by input signals to assume a multiplicity of states indicated by output signals each state representative of a numerical count, means connected to the counting means input and to the first and the second computer and controlled by respective ones of said execution means for supplying input signals to selectively count the counting means bi-directionally, interrogation means connected to the counting means output and to the first and second computers for receiving counting means output signals determinative of the states of the counting means, and means connected to the interrogation means for controlling the execution of respective ones of said computer programs in accordance with the states of the counting means.

2. Apparatus for the solution of problems by multiple computers including a first and a second computer each for processing data manifestations in accordance with programs of instruction manifestations and each including means for executing programs input means for receiving manifestations and output means for supplying manifestations, bi-directional counting means having an input and an output capable of assuming a multiplicity of states in accordance with manifestations at said input each state causing manifestations representative of a numerical count at said output, means connected to said first and said second computer output means and to said counting means input and controlled by the respective ones of said execution means for supplying signals effective to selectively count said counting means bi-directionally, means connecting said first computer inputs and outputs to the outputs and inputs respectively of said second computer operable to transfer manifestations between said computers, and means connected to said connecting means and to said counting means output under the control of signals from said counting means output for making operative said connecting means.

3. Apparatus for multiplexing computers comprising: a first computer for processing data manifestations in accordance with programs of instruction manifestations, a second computer for processing data manifestations in accordance with programs of instruction manifestations, bi-directional counting means capable of assuming a multiplicity of states under control of signals at an input each state resulting in signals at an output representative of a numerical count, means connected to said first and said second computer and to said counting means input and controlled by said programs for supplying signals to said counting means input for selectively counting the counting means bi-directionally, means connecting said first and said second computers operative to transfer manifestations between said computers, and means connected to said connecting means and to said counting means output under the control of said counting means output signals for making said connecting means selectively operative and inoperative.

4. Multiplexing apparatus comprising: a first and a second computer each a processing data manifestations in accordance with programs of instruction manifestations, each including means for executing said programs and input/output means for receiving and transmitting manifestations; connecting means between said first and said second computers respective input/output means operable to transfer manifestations between said computers; counting means capable of assuming a multiplicity of states each state having an output for emitting manifestations representative of a numerical count and an input for receiving state changing manifestations; means connected to said first and said second computer input/output means and said counting means input and controlled by said execution means for supplying manifestation for selectively causing changes in the states of said counting means representative of increasing and decreasing counts; first means connected between said connecting means and said counting means output under the control of said counting means output manifestations for operating said connecting means when the state of said counting means is representative of a first predetermined count; and second means connected between said connecting means and said counting means output under the control of said counting means output manifestations for operating said connecting means when the state of said counting means is representative of a second predetermined count.

5. Multiplexing apparatus comprising: a first and a second computer each operable to process data manifestations in accordance with programs of instruction manifestations and each including means for executing said programs and means for externally communicating manifestations; connecting means between said first and said second computers external communicating means operable to transfer manifestations between said computers; counting means, having an input and an output capable of assuming a multiplicity of states in accordance with input manifestations each state appearing as output signals representative of a numerical count; means connected to said first and said second computer external communication means and to said counting means input and controlled by said execution means supplying manifestations to said counting means input for selectively causing changes in said states of said counting means representative of increasing and decreasing counts; first means connected to said counting means output operable, by manifestations of said counting means states representative of a first predetermined count, to emit first signals; second means connected to said counting means output operable, by manifestations of said counter states representative of a second predetermined count, to emit second signals; first transfer means connected between said connecting means and said first signal means under the control of said first signals to make said connecting means operable to transfer manifestations from said first to said second computer; and second transfer means connected between said connecting means and said second signal means under the control of said second signals to make said connecting means operable to transfer manifestations from said second to said first computer.

6. Apparatus for the cooperative solution of problems by multiple data processors comprising: first and second data processors each including memory means for retaining data manifestations and for retaining a program of instruction manifestations, computation means connected to said memory means for processing said data manifestations and transmitting result manifestations, execution means for connected to said memory means and said computation means executing said program of instruction manifestations and input/output means associated with said computation means, memory means and execution means for receiving and presenting manifestations externally; counter means having an input and an output capable of assuming a number of predetermined states of a sequence of distinguishable states each state representative of a numerical quantity; first means connected to said counter input for supplying decrement signals operable to change said counter states in a manner representative of counting said numerical quantities down; second means connected to said counter input for supplying increment signals operable to change said counter states in a manner representative of counting said numerical quantities up; indication means connected to said counter output for providing indications of the states of said counter; first connection means between said first data processor and said second data processor input/output means for transferring manifestations between said data processors; second and third connection means connected between each of said first and said second data processor input/output means to both said first and said second means connected to said counter input means for routing manifestations effective supply increment and decrement signals to count said counter means up and down in accordance with predetermined instruction manifestations; fourth and fifth connection means connected between said indication means and said first and second data processor input/output means for providing to corresponding ones of said execution means indications of the counter states, and means connected to said execution means and operable by said provided indications to cause said execution means to vary execution of said programs in accordance with said counter states.

7. Apparatus for the cooperative processing of data comprising: a first computer including means for receiving and transmitting data manifestations, and means for transmitting manifestations represetative of function requests; a second computer including means for receiving and transmitting data manifestations and transmitting manifestations representative of function requests; a counter having a count input and an output; first input means connected to said counter count input for increasing the count of said counter; second input means connected to said counter count input for decreasing the count of said counter; means connected to said counter output for transmitting manifestations representative of the count of said counter; first means connecting said first computer and said second computer data receiving and transmitting means; second means connecting said first connecting means and said output means; a first function generator connected to the function request transmission means of said first computer; means connected to said first function generator having on output for transmitting function command manifestations, a second function generator connected to the function request transmission means of said second computer; means connected to said second function generator having an output for transmitting function command manifestations; a mixer connected to the output of said first function generator and to the output of said second function generator; first output means connected between said mixer and said first input means to said counter operable to increase the count of said counter; second output means connected between said mixer and said second input means to said counter operable to decrease the count of said counter; and timing control means connected to said first and second function generators for preventing interference between function requests transmitted by said first and said second computers.

8. Apparatus of the type described in claim 7 wherein there is provided decoding means connected to said means connected to said counter output; first output means connected to said decoding means for generating first signals indicating that said counter count has reached a first preselected number; second output means connected to said decoding means for generating second signals indicating that said counter count has reached a second preselected number; count increase blocking means interposed between said first input means of said counter input and said first output of said mixer, operable by said first signals from said decoding means; and a count decrease blocking means interposed between said second input means of said counter input and said second output of said mixer operable by said second output of said decoding means.

9. Apparatus for the cooperative processing of data manifestations comprising: input means; output means; first and second computers each including memory means for retaining data manifestations and for retaining programs of instruction manifestations, computation means connected to said memory means for processing data manifestations and transmitting result manifestations, execution means connected to said memory and computation means for executing said programs, said programs including a read program, a process program, and a transmit program; and input/output means connected to said execution, memory and computation means first means connecting said input means with said first computer input/output means; means interposed in said first connecting means and under the control of said read program of said first computer for transferring data manifestations from said input means to said first computer input/output means; second means connecting said output means and second computer input/output means; means interposed in said second connecting means and under the control of said transmit program of said second computer for transferring data manifestations from said second computer input/output means to said output means; third means connecting said first computer input/output means and said second computer input/output means; first means interposed in said third connecting means and under the control of said transmit program of said first computer for transferring data manifestations from said first computer input/output means to said third connecting means; second means interposed in said third connected means and under the control of said read program of said second computer for transferring data manifestations from said third connecting means to said second computer input/ouput means; counter means connected to the input/output means of both said first and said second computers, for specifying a count at a count output operable to count up and down in accordance with signals at a count input; means connected to said first computer input/output means and said counter count input for counting said counter up under the control of instruction manifestations; means connected to the input/output means of said second computer and said counter count input for counting said counter down under the control of instruction manifestations; first means connected to said first computer input/output means and said counter count output for determining the contents of said counter; means connected to said first computer input/output means and to said first determination means, responsive to a preselected one of a predetermined set of counts specified at said output of said counter for initiating said read program of said first computer; means connected to said second computer input/output means and said counter count output for determining the contents of said counter; and means connected to said second computer input/output means and to said second determination means, responsive to preselected others of said predetermined set of counter counts specified at said counter output for initiating said read program of said second computer.

10. Apparatus for the cooperative processing of data manifestations comprising; first and second computers each including memory means for retaining data manifestations and for retaining programs of instruction manifestations said programs including a number of dependent programs, a number of independent programs, and an assistance program, computation means connected to said memory means for processing data manifestations and transmitting result manifestations, execution means connected to said memory means and to said computation means for executing said programs, external communications means connected to said memory, computation and execution means; counter means connected to both said first and said second computers external communication means, capable of assuming states representative of counts indicated by signals at an output, and operable to be counted up and down in accordance with signals at an output; means connected to said first computer external communication means and to said counter input for supplying signals under the control of instruction manifestations to count said counter up; means connected to said second computer external communication means and to said counter input for supplying signals under the control of instruction manifestations to count said counter down; means connected to said first and said second computers external communication means and to said counter output for receiving signals determinative of the states of said counter; first means connected to said first and second computer external communication means responsive to signals representing a counter state equivalent to a first count, for transferring data manifestations and a number of said independent programs from said first computer external communication means to said second computer external communication means; second means connected to said first and said second computer external communication means, responsive to signals responsive to a counter state equivalent to a second count for transferring data manifestations and a number of said independent programs from said second computer to said first computer; and means connected to said first and second computer external communication means under the control of said assistance programs of said first and said second computers for causing operation of said first and second computer computation means for processing transferred and nontransferred independent programs in said first and said second computers simultaneously.

11. In combination: a plurality of computers each operable to process data manifestations under the control of a program of instruction manifestations including priority-indicative instructions and each computer including input/output means operable to permit external communication by said computers; bus means interconnecting the input/output means of said computers operable to transfer instruction and data manifestations between said computers in a selected one of two directions; priority recognition means having a first input connected to said first computer input/output means, a second input connected to said second computer input/output means and an output; means connected to said bus means and to said priority recognition means output, responsive to priority-indicative instruction manifestations received at said first and second inputs to make said bus means operable in a direction specified at said output.

12. Apparatus for permitting first and second computers to jointly process data in accordance with shared programs of instructions, including priority designation instructions, comprising: interconnection means connected between said first and said second computers operable in a first mode to transfer data and instructions from said first computer to said second computer and in a second mode to transfer data and instructions from said second computer to said first computer; priority means connected to said first computer and to said second computer having an output for emitting signals indicative of relative priorities designated by priority designation instructions of said computers; and gating means connected to said interconnection means and to said priority means output, operable by said output signals to control the mode of operation of said interconnection means.

13. In program-controlled data processing systems wherein different programs may be assigned different priorities of execution, apparatus for permitting a plurality of systems to work in concert, including: a plurality of first and second means connected to each of said systems operable to emit signals indicative of the current priority of the currently executed program; means connected to said plurality of priority indicative signal emission means operable to generate at an output signals indicative of the relative priorities of programs currently being executed by said systems; means interconnecting to said systems operable to transfer programs and data among said systems; and means connecting said interconnecting means and said relative priority signal generation means output operable by said relative priority signals to make said interconnecting means operable to transfer programs having one priority between systems for execution by a system having a current program with lower priority than said one priority, in place of its current program.

14. In a data processing apparatus, the combination of a plurality of means each means capable of processing data manifestations, a plurality of counting means each counting means being operable by a different pair of said processing means for registering counts, an operation controlling means for each processing means and test connections from each operation controlling means to all counting means operable by the processing means connected thereto for enabling cooperative processing of data by said processing means.

15. In a data processing apparatus, the combination of a plurality of independently operable processing means, each means capable of performing a settable program of operations on data entered therein, a plurality of counters, each counter connected for operation by a pair of processing means one of which receives partially processed data from the other, an operation controlling means for each processing means, and sensing means from each operation controlling means to at least one of said counters connected to its processing means for determining the presence of operation enabling counts in said counters.

16. A data processing apparatus comprising a plurality of independently operable data manipulation means, each having a data receiving and a data transmitting portion, transmission means connecting said data manipulation means into a network, a plurality of counters, each connected between an adjacent pair of said manipulation means for counting data receiving and transmitting operations by said pair of connected means, and an operation controlling portion in each data manipulation means, said controlling portion being responsive to the representations in each counter connected to its manipulation means for determining when data is available to its manipulation means.

17. Apparatus for multiplexing a plurality of computers to enable a pipeline type of data processing, each computer including a data receiving portion, a data transmitting portion and an operation control portion, means connecting the receiving and transmitting portions of said computers into a data processing network, at least one counting means, a counter incrementing means energized by said operation control portion of one of said computers, a counter decrementing means driven by said operation control portion of a second of said computers, said one and said second computers being adjacent in said network and counter sensing connections from each operation control portion to at least one of said counters driven thereby to enable said operation control means for only selected counter values.

References Cited by the Examiner

UNITED STATES PATENTS 2,968,696 1/1961 Trousdale.

OTHER REFERENCES

Pp. 101–107—Chao: "The System Organization of MOBIDIC B," 1959 Proc. of the E.J.C.C.

Pp. 115–128—Deiner et al.: "Organizing a Network of Computers to Meet Deadlines," 1957 Proc. of the E.J.C.C.

ROBERT C. BAILEY, *Primary Examiner.*

IRVING L. SRAGOW, MALCOLM A. MORRISON, *Examiners.*